(12) United States Patent
Lazarescu et al.

(10) Patent No.: US 9,313,098 B1
(45) Date of Patent: Apr. 12, 2016

(54) ESTABLISHMENT OF CONNECTION CHANNELS BETWEEN COMPLEMENTARY AGENTS

(71) Applicants: Alec Anton Lazarescu, Fanwood, NJ (US); Matthew Joseph Shapiro, Aurora, CO (US)

(72) Inventors: Alec Anton Lazarescu, Fanwood, NJ (US); Matthew Joseph Shapiro, Aurora, CO (US)

(73) Assignee: PEARSON EDUCATION, INC., New York, NY (US)

( * ) Notice: Subject to any disclaimer, the term of this patent is extended or adjusted under 35 U.S.C. 154(b) by 0 days.

(21) Appl. No.: 14/850,604

(22) Filed: Sep. 10, 2015

(51) Int. Cl.
*G06F 15/173* (2006.01)
*H04L 12/24* (2006.01)
*H04L 12/26* (2006.01)
*H04L 29/08* (2006.01)

(52) U.S. Cl.
CPC ............ *H04L 41/0806* (2013.01); *H04L 43/04* (2013.01); *H04L 43/08* (2013.01); *H04L 67/18* (2013.01)

(58) Field of Classification Search
None
See application file for complete search history.

*Primary Examiner* — Brian P Whipple
(74) *Attorney, Agent, or Firm* — Kilpatrick Townsend & Stockton LLP

(57) ABSTRACT

Embodiments relate to dynamically establishing and reconfiguring connection channels. More specifically, performance metrics for each agent may be quantitatively assessed, complementary agents may be identified based on the performance metrics, and connection channels may be established between the complementary agents. Performance metrics may continue to be monitored, and connection channels may be reconfigured so as to improve individual agents' metrics or a cluster of agents' metrics.

20 Claims, 13 Drawing Sheets

ESTABLISHMENT OF CONNECTION CHANNELS BETWEEN COMPLEMENTARY AGENTS

FIELD

This disclosure relates to dynamically establishing and reconfiguring connection channels. More specifically, performance metrics for each agent may be quantitatively assessed, complementary agents may be identified based on the performance metrics, and connection channels may be established between the complementary agents. Performance metrics may continue to be monitored, and connection channels may be reconfigured so as to improve individual agents' metrics or a cluster of agents' metrics.

BACKGROUND

As the number of electronic devices on various networks continues to increase, the number of potential inter-device connections is exploding. Aside from smartphones, new classes of devices and accompanying sensors under the nomenclature Internet of Things (IoT) are being developed further increasing potential data sources and volumes. Meanwhile, various resources may be absolutely or practically limited, such that connections must be selectively established. Further selection may be required to identify what type of connection facilitates efficient flow of information.

SUMMARY

In some embodiments, a system is provided for facilitating establishment of wireless data-conference channels or wired-channel connections and transmitting data. A performance-monitoring subsystem, for each of a plurality of agents: detects an output associated with the agent from a device; and identifies a metric that is indicative of a type of performance based on the output. A connection controller subsystem detects, based on the identified metrics, an inter-agent metric discrepancy between a first metric indicative of the type of performance and a second metric indicative of the type of performance. The first metric is associated with a first agent of the plurality of agents and the second metric is associated with a second agent of the plurality of agents. The connection controller subsystem also facilitates establishment of a wireless data-conference channel or connection through routing through a wired channel between a first device associated with first agent and a second device associated with the second agent. A content delivery subsystem identifies a set of data based on the first metric. The set of data corresponds to an electronic content object. The content delivery subsystem also transmits the set of data to each of the first device and to the second device.

In some embodiments, a method is provided for facilitating establishment of wireless data-conference channels or wired-channel connections and transmitting data. For each of a plurality of agents: detecting an output associated with the agent from a device; and identifying a metric that is indicative of a type of performance based on the output. Based on the identified metrics, an inter-agent metric discrepancy is detected between a first metric indicative of the type of performance and a second metric indicative of the type of performance. The first metric is associated with a first agent of the plurality of agents and the second metric is associated with a second agent of the plurality of agents. Establishment of a wireless data-conference channel or connection through routing through a wired channel between a first device associated with first agent and a second device associated with the second agent is facilitated. A set of data is identified based on the first metric. The set of data corresponds to an electronic content object. The set of data is transmitted to each of the first device and to the second device.

In some embodiments, a computer-program product tangibly embodied in a non-transitory machine-readable storage medium is provided that includes instructions configured to cause one or more data processors to perform part or all of one or more methods or processes disclosed herein.

In some embodiments, a computer program product is provided that is tangibly embodied in a non-transitory machine-readable storage medium. The computer program product includes instructions configured to cause one or more data processors to perform actions including part or all of a method disclosed herein.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1A:
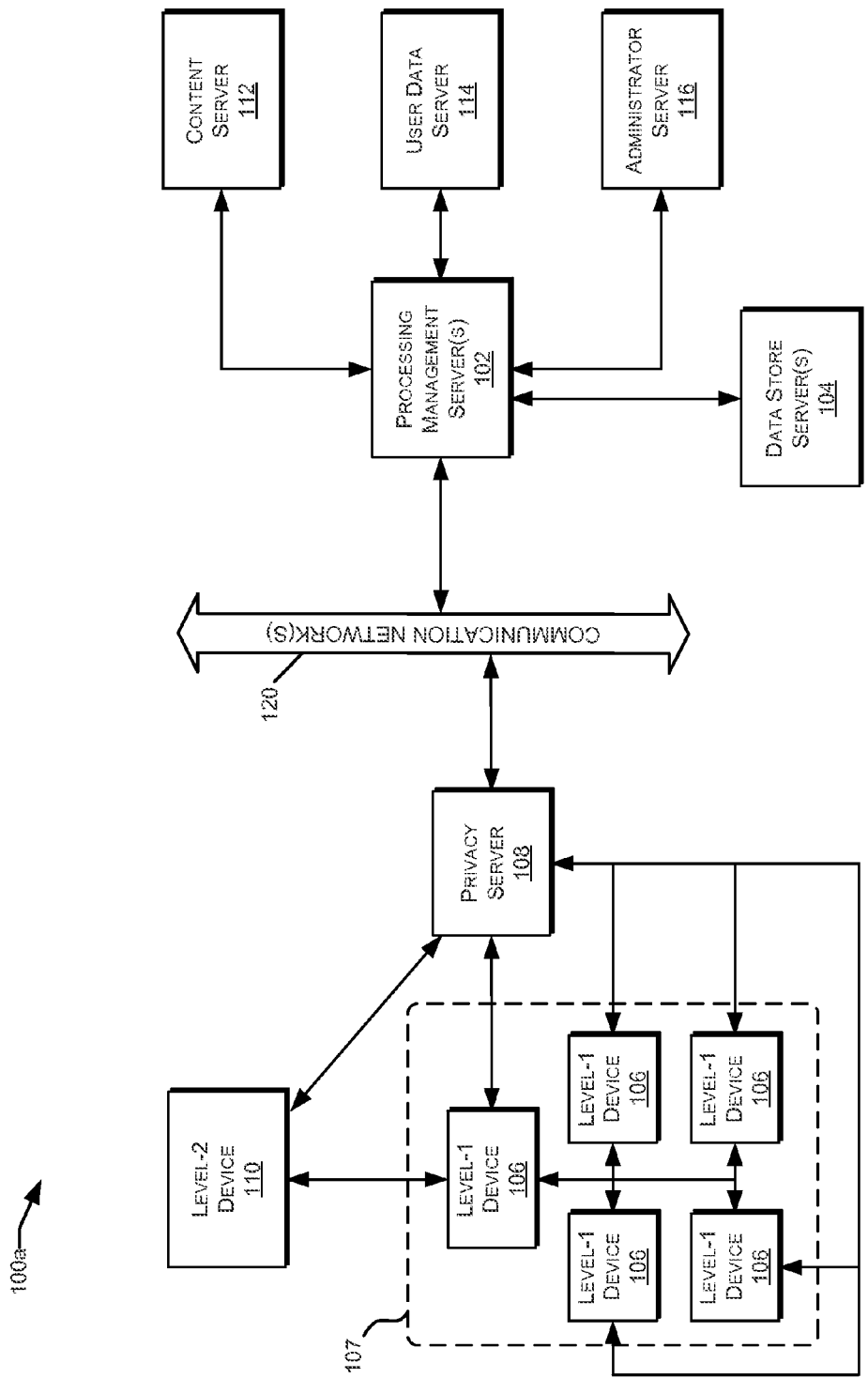
FIGS. 1A and 1B are block diagrams showing illustrating an example of a network.

With reference now to FIG. 1A, a block diagram is shown illustrating various components of a network 100a (e.g., a content distribution network (CDN), device-connection network, and/or task-performance network) that implements and supports certain embodiments and features described herein. Network 100a may include one or more processing management servers 102. As discussed below in more detail, processing management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Processing management server 102 may include one or more server farms, clusters, or any other appropriate arrangement and/or combination or computer servers. Processing management server 102 may act according to stored instructions located in a memory subsystem of the server 102, and may run an operating system, including any commercially available server operating system and/or any other operating systems discussed herein.

Processing management server 102 may be configured to manage, control or (partly or fully) define (for example) devices to be included in a network, connection channels, electronic content objects to be transmitted to and/or identifiable at one or more devices, and/or operations to be performed at one or more devices. Processing management server 102 can thus, for example, assign one or more objects and/or tasks to various devices (and/or associated users), monitor task performances, establish connection channels between devices and/or servers, and so on.

The network 100a may include one or more data store servers 104, such as database servers and file-based storage systems. Data stores 104 may comprise stored data relevant to the functions of the network 100a. Illustrative examples of data stores 104 that may be maintained in certain embodiments of the network 100a are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Network 100a also may include one or more level-1 (e.g., user) devices 106 and/or level-2 (e.g., supervisor) devices 110. Level-1 devices 106 and level-2 devices 110 may display content received via the network 100a, and may support various types of user interactions with the content. Level-1 devices 106 and level-2 devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other level-1 devices 106 and level-2 devices 110 may be general purpose personal computers or special-purpose computing devices including, by way of example, personal computers, laptop computers, workstation computers, projection devices, and interactive room display systems. Additionally, level-1 devices 106 and level-2 devices 110 may be any other electronic devices, such as a thin-client computers, an Internet-enabled gaming systems, business or home appliances, and/or a personal messaging devices, capable of communicating over network(s) 120.

In different contexts of networks 100a, level-1 devices 106 and level-2 devices 110 may correspond to different types of specialized devices, for example, student devices and teacher devices, employee devices and presentation devices in a company network, different gaming devices in a gaming network, etc. In some embodiment, each of one, more or all level-1 devices 106 and/or level-2 devices 110 is operated by and/or associated with an agent (e.g., a student or user). In some embodiments, level-1 devices 106 and level-2 devices 110 may operate in the same physical location 107, such as a given room. In such cases, the devices may contain components that support direct communications with other nearby devices, such as a wireless transceivers and wireless communications interfaces, Ethernet sockets or other Local Area Network (LAN) interfaces, etc. In other implementations, the level-1 devices 106 and level-2 devices 110 need not be used at the same location 107, but may be used in remote geographic locations in which each level-1 device 106 and level-2 device 110 may use security features and/or specialized hardware (e.g., hardware-accelerated SSL and HTTPS, WS-Security, firewalls, etc.) to communicate with the processing management server 102 and/or other remotely located level-1 devices 106. Additionally, different level-1 devices 106 and level-2 devices 110 may be assigned different designated roles, and in such cases the different devices may be provided with additional hardware and/or software components to provide content and support user capabilities not available to the other devices.

The network 100a also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the processing management server 102) located outside the jurisdiction. In such cases, the privacy server 108 may intercept communications between a level-1 device 106 or level-2 device 110 and other devices that include private user information. The privacy server 108 may create a token or identifier that does not disclose the private information and may use the token or identifier when communicating with the other servers and systems, instead of using the user's private information.

As illustrated in FIG. 1, the processing management server 102 may be in communication with one or more additional servers, such as a content server 112, a user data server 112, and/or an administrator server 116. Each of these servers may include some or all of the same physical and logical components as the processing management server(s) 102, and in some cases, the hardware and software components of these servers 112-116 may be incorporated into the processing management server(s) 102, rather than being implemented as separate computer servers.

Content server 112 may include hardware and software components to generate, store, and maintain the content resources for distribution to level-1 devices 106 and other devices in the network 100a. For example, in networks 100a, content server 112 may include data stores of training materials, presentations, interactive programs and simulations, course models and/or outlines, and various training interfaces that correspond to different materials and/or different types of level-1 devices 106. In networks 100*a* used for media distribution, interactive gaming, and the like, a content server 112 may include media content files such as music, movies, television programming, games, and advertisements.

User data server 114 may include hardware and software components that store and process data for multiple users relating to each user's activities and usage of the network 100*a*.

For example, the processing management server 102 may record and track each user's system usage, including their level-1 device 106, content resources accessed, and interactions with other level-1 devices 106. This data may be stored and processed by the user data server 114, to support user tracking and analysis features. For instance, the user data server 114 may store and analyze each user's training materials viewed, presentations attended, programs completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the processing management server 102 and other components within the network 100*a*. For example, the administrator server 116 may monitor device status and performance for the various servers, data stores, and/or level-1 devices 106 in the network 100*a*. When necessary, the administrator server 116 may add or remove devices from the network 100*a*, and perform device maintenance such as providing software updates to the devices in the network 100*a*. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The network 100*a* may include one or more communication networks 120. Although only a single network 120 is identified in FIG. 1, the network 100*a* may include any number of different communication networks between any of the computer servers and devices shown in FIG. 1 and/or other devices described herein. Communication networks 120 may enable communication between the various computing devices, servers, and other components of the network 100*a*. As discussed below, various implementations of networks 100*a* may employ different types of networks 120, for example, computer networks, telecommunications networks, wireless networks, and/or any combination of these and/or other networks.

Figure 1B:
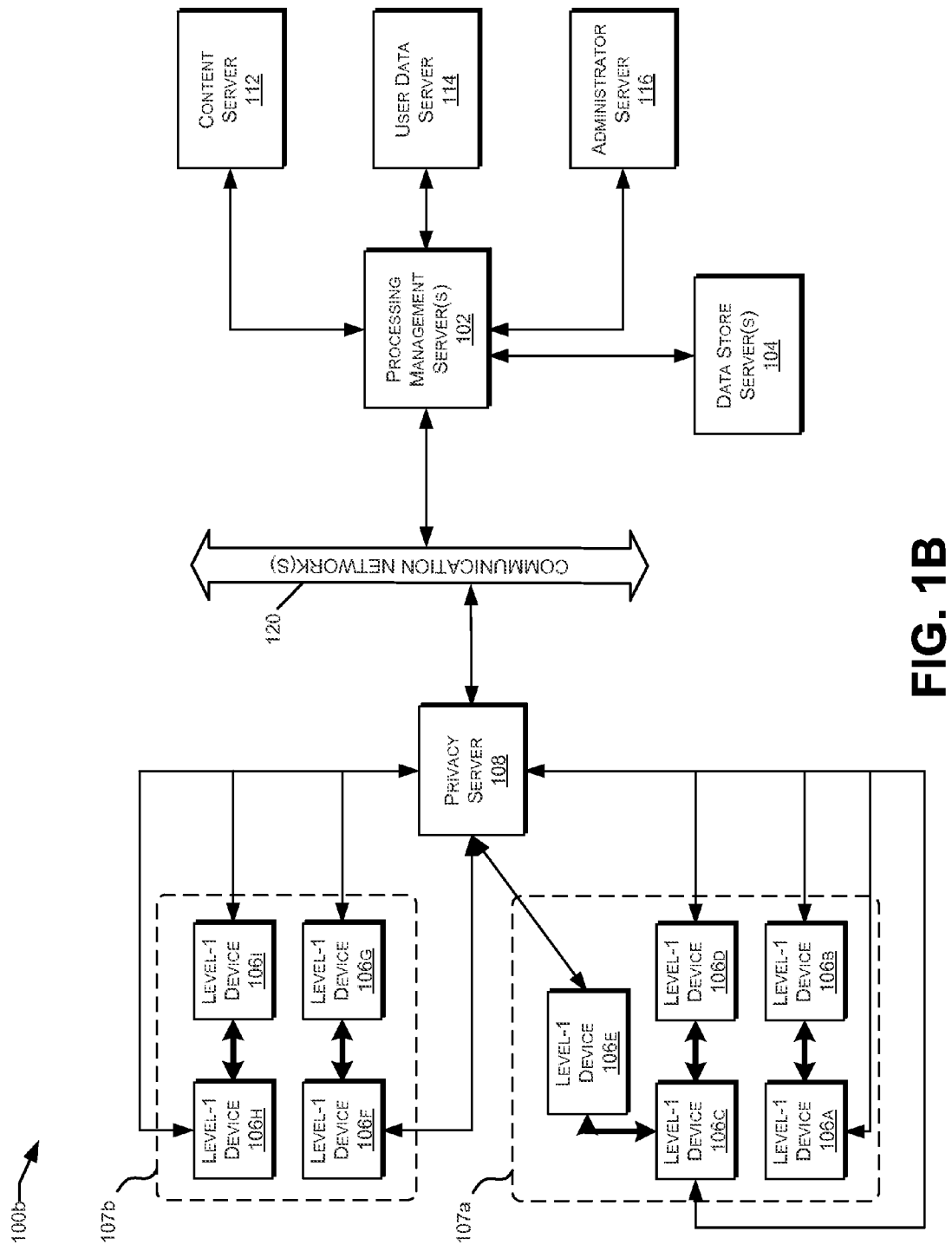

FIG. 1B shows a block diagram illustrating various components of a network 100*b* (e.g., a content distribution network (CDN), device-connection network, and/or task-performance network) that implements and supports certain embodiments and features described herein. Various components of network 100*b* may be similar to similarly numbered components in network 100*a*. It will be appreciated that, in various embodiments, a network may include some features of network 100*a* and some features of network 100*b*. For example, a network may include the features of network 100*b* but also include a level-2 device 110, as included in network 100*a*.

As described herein, various techniques can be used to identify configurations for and to establish connection channels between agent and/or agent devices. Such techniques may select agents to connect via an analysis, for example, of device sensor data, location and/or performance metric. The bolded arrows in FIG. 1B (between devices 106*a-b*, 106*c-d*, 106*c* and *e*, 106*f-g* and 105*h-i*) represent connection channels. Nonetheless, each level-1 device 106*a-h* maintains a connection with remote processing management server 102 (via privacy server 108 and communication network 120). It will be appreciated that such a connection need not be routed through a privacy server, may be routed (additionally or instead) through a level-2 device and/or that communications from/to level-1 devices in location 107*a* may be routed through a different privacy server than those from/to level-1 devices in location 107*b*.

In this illustration, devices 106*a-e* are located within a first physical location 107*a* and devices f-I are located within a second physical location 107*b*. A shared physical location may be, in some instances, a requirement or constraint for establishing a connection channel between multiple devices. In some instances, another shared agent and/or device specification may be additionally or alternatively required (e.g., an association with a same level-2 device, same institution level or same institution (e.g., school)).

A shared-specification requirement for establishing a connection may, but need not, also apply to maintaining a connection. For example, if two connected devices become separated by a threshold distance or leave a designated area, the connection may terminate (e.g., permanently or until proximity is resumed) or it may be maintained. In the latter instance, a network used for a connection may, or may not, change. For example, a connection may change from one using a short-range network (e.g., Bluetooth) to one using WiFi.

A connection channel may facilitate and/or include, for example, a screen sharing, a secure message exchange, a chat, a voice call, a real-time synchronous message exchange (e.g., such that one device receives messages as they are being generated at the other device), an asynchronous message exchange, a streaming communication, etc. A connection channel may further facilitate enabling one agent to at least partly control operations on a device of another agent (e.g., within an app).

Figure 2:
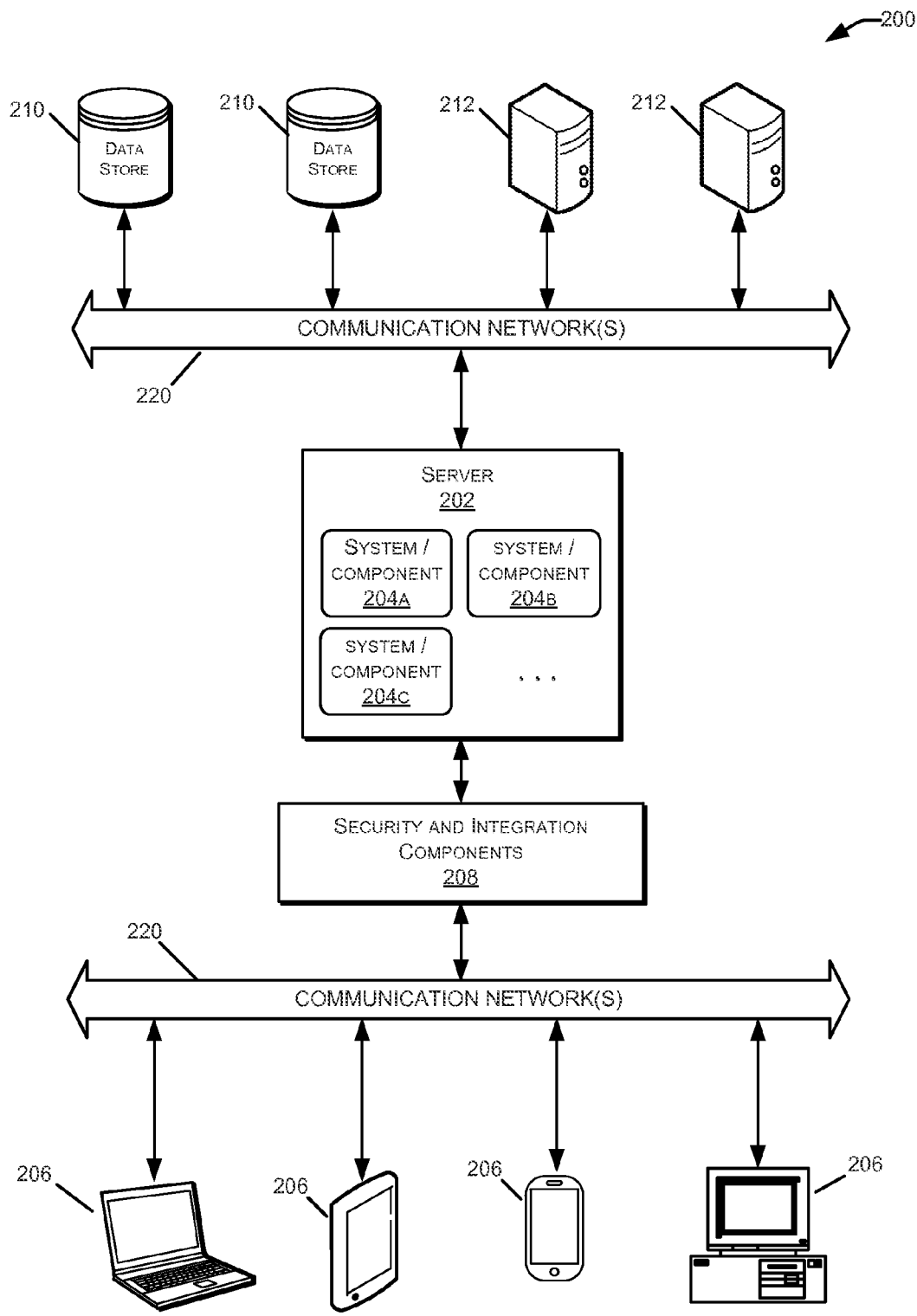
FIG. 2 is a block diagram illustrating a computer server and computing environment within a network.

With reference to FIG. 2, an illustrative distributed computing environment 200 is shown including a computer server 202, four client computing devices 206, and other components that may implement certain embodiments and features described herein. In some embodiments, the server 202 may correspond to the processing management server 102 discussed above in FIG. 1, and the client computing devices 206 may correspond to the level-1 devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and networks 100a. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and level-1 devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the network 100a. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the network 100a. Such web services, including cross-domain and/or cross-platform web services, may be developed for enterprise use in accordance with various web service standards, such as the Web Service Interoperability (WS-I) guidelines. For example, some web services may use the Secure Sockets Layer (SSL) or Transport Layer Security (TLS) protocol to provide secure connections between the server 202 and level-1 devices 206. SSL or TLS may use HTTP or HTTPS to provide authentication and confidentiality. In other examples, web services may be implemented using the WS-Security standard, which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN).

Figure 3:
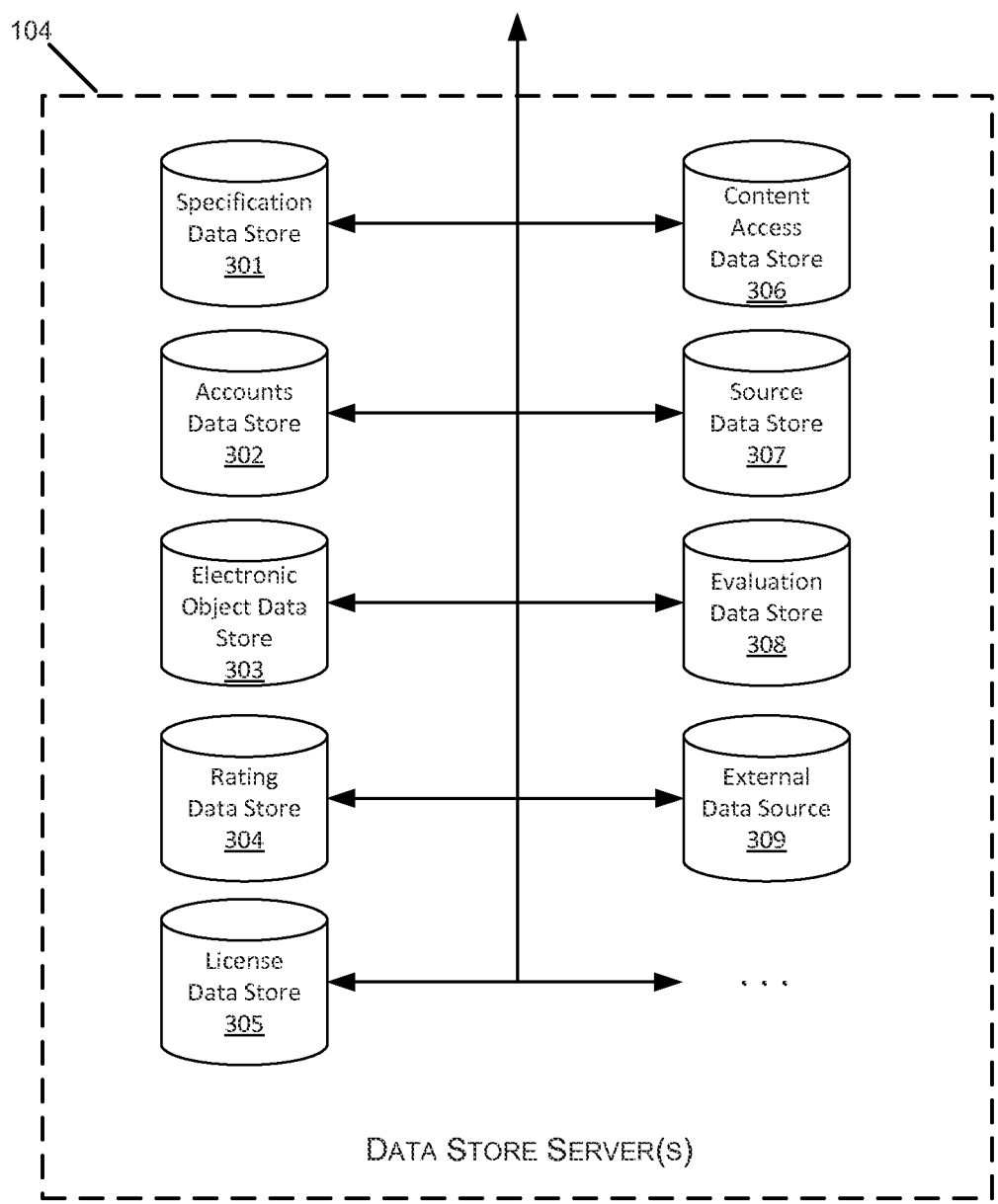
FIG. 3 is a block diagram illustrating an embodiment of one or more data store servers within a network.

With reference to FIG. 3, an illustrative set of data stores and/or data store servers is shown, corresponding to the data store servers 104 of the network 100a discussed above in FIG. 1. One or more individual data stores 301-309 may reside in storage on a single computer server 104 (or a single server farm or cluster) under the control of a single entity, or may reside on separate servers operated by different entities and/or at remote locations. In some embodiments, data stores 301-309 may be accessed by the processing management server 102 and/or other devices and servers within the network 100a (e.g., level-1 devices 106, level-2 devices 110, administrator servers 116, etc.). Access to one or more of the data stores 301-309 may be limited or denied based on the processes, user credentials, and/or devices attempting to interact with the data store.

In one instance, some or all of data stores 301-309 reside in storage on a remote server 104 and a corresponding data store for each of at least one of data stores 301-309 or another data store reside in a relay device. Thus, the relay device may receive data from the remote server and store the data locally (e.g., to facilitate subsequent transmission to a user device). Similarly, a corresponding data store for at least one of data stores 301-309 or another data store may reside at a user device 106. For example, a processing management server 102 may provide select data from evaluation data store 308 to a relay device (which can store the data in a corresponding data store), which can transmit some or all of the data to a user device.

The paragraphs below describe examples of specific data stores that may be implemented within some embodiments of a network 100a. It should be understood that the below descriptions of data stores 301-309, including their functionality and types of data stored therein, are illustrative and non-limiting. Data stores server architecture, design, and the execution of specific data stores 301-309 may depend on the context, size, and functional requirements of a network 100a. For example, in content distribution systems 100a used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100a used for media distribution from content providers to subscribers, separate data stores may be implemented in data stores server(s) 104 to store listings of available content titles and descriptions, content title usage statistics, subscriber specifications, account data, payment data, network usage statistics, etc.

A specification data store 301 may include specifications or information relating to the end users within the network 100a. This specifications may include characteristics such as the user names, access credentials (e.g., logins and passwords), and information relating to any previous user interactions within the network 100a (e.g., requested content, posted content, content modules completed, training scores or evaluations, other associated users, etc.).

An accounts data store 302 may generate and store account data for different users in various roles within the network 100a. For example, accounts may be created in an accounts data store 302 for individual end users, supervisors, administrator users, and entities such as companies or institutions. Account data may include account types, current account status, account characteristics, and any parameters, limits, restrictions associated with the accounts.

An electronic object data store 303 may include information describing the individual electronic content items (or content resources) available via the network 100a. In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), rate attributes of the content resources (e.g., a price and/or structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources.

A rating data store 304 may include rating (e.g., pricing) information and/or rating structures for determining payment amounts for providing access to the network 100a and/or the individual content resources within the network 100a. In some cases, rating may be determined based on a user's access to the network 100a, for example, a time-based subscription fee, or rating based on network usage. In other cases, rating may be tied to specific content resources. Certain content resources may have associated rating information, whereas other rating determinations may be based on the resources accessed, the specifications and/or accounts of the user, and the desired level of access (e.g., duration of access, network speed, etc.). Additionally, the rating data store 304 may include information relating to compilation rating for groups of content resources, such as group rates and/or rate structures for groupings of resources.

A license data store 305 may include information relating to licenses and/or licensing of the content resources within the network 100a. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the network 100a and specific content resources. For example, the content access data store 306 may include login information (e.g., user identifiers, logins, passwords, etc.) that can be verified during user login attempts to the network 100a. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, level, etc. Certain users may have supervisory access over one or more end users, allowing the supervisor to access all or portions of the end user's content, activities, evaluations, etc. Additionally, certain users may have administrative access over some users and/or some applications in the content management network 100a, allowing such users to add and remove user accounts, modify user access permissions, perform maintenance updates on software and servers, etc.

A source data store 307 may include information relating to the source of the content resources available via the network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100a. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100a. The evaluation data store 308 also may include information relating to evaluation processing tasks, for example, the identification of users and level-1 devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

In addition to the illustrative data stores described above, data store server(s) 104 (e.g., database servers, file-based storage servers, etc.) may include one or more external data aggregators 309. External data aggregators 309 may include third-party data sources accessible to the content management network 100a, but not maintained by the content management network 100a. External data aggregators 309 may include any electronic information source relating to the users, content resources, or applications of the network 100a. Data retrieved from various external data aggregators 309 may be used to verify and update user account information, suggest user content, and perform user and content evaluations.

Figure 4A:
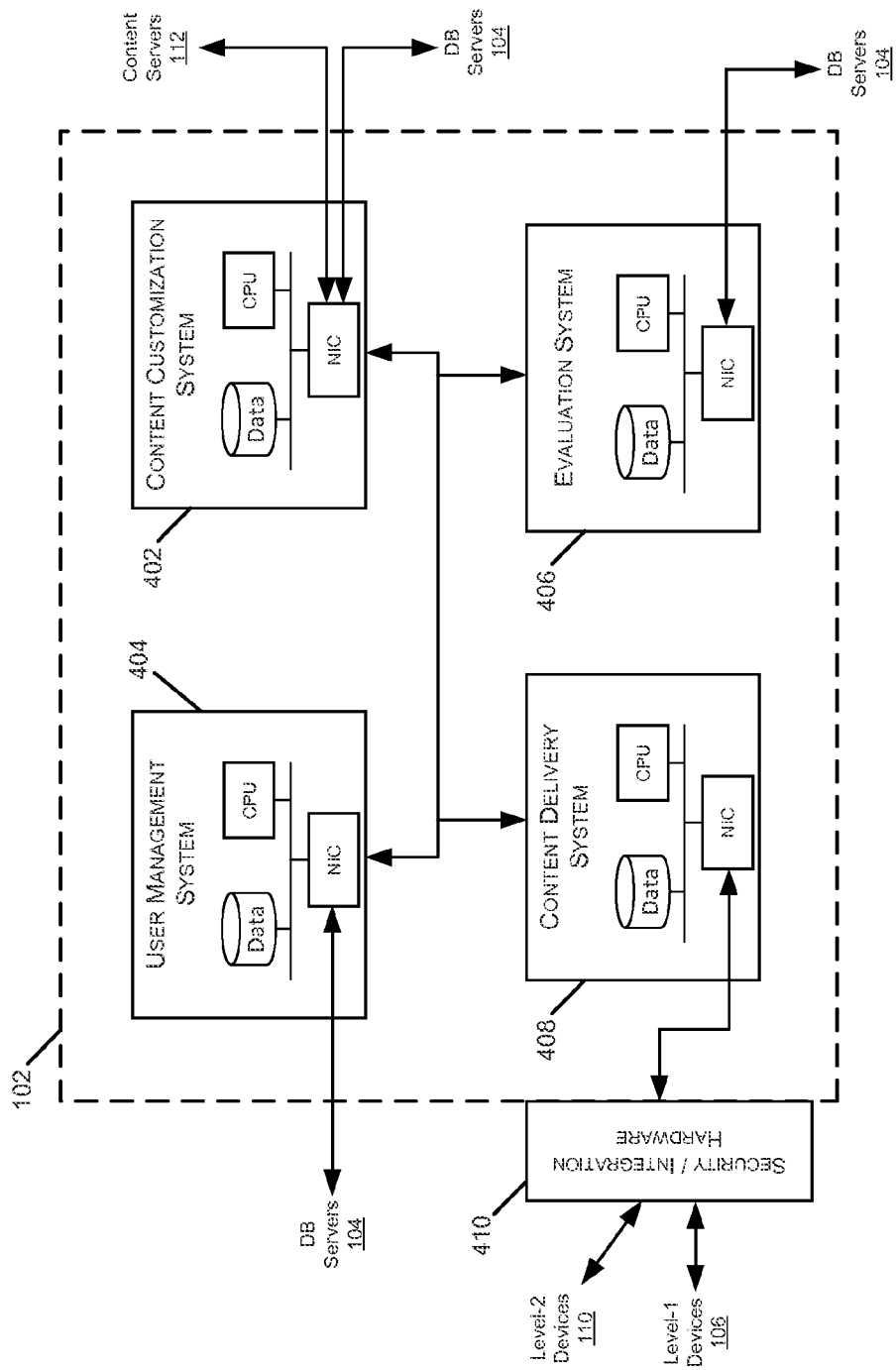
FIGS. 4A and 4B are block diagrams illustrating an embodiment of one or more processing management servers within a network.

With reference now to FIG. 4A, a block diagram is shown illustrating an embodiment of one or more processing management servers 102 within a network 100a. As discussed above, processing management server(s) 102 may include various server hardware and software components that manage the content resources within the network 100a and provide interactive and adaptive content to users on various level-1 devices 106. For example, processing management server(s) 102 may provide instructions to and receive information from the other devices within the network 100a, in order to manage and transmit content resources, user data, and server or client applications executing within the network 100a.

A processing management server 102 may include a content customization system 402. The content customization system 402 may be implemented using dedicated hardware within the network 100a (e.g., a content customization server 402), or using designated hardware and software resources within a shared processing management server 102. In some embodiments, the content customization system 402 may adjust the selection and adaptive capabilities of content resources to match the needs and desires of the users receiving the content. For example, the content customization system 402 may query various data stores and servers 104 to retrieve user information, such as user preferences and characteristics (e.g., from a specification data store 301), user access restrictions to content recourses (e.g., from a content access data store 306), previous user results and content evaluations (e.g., from an evaluation data store 308), and the like. Based on the retrieved information from data stores 104 and other data sources, the content customization system 402 may modify content resources for individual users.

It will be appreciated that, though FIG. 4 shows processing management server 102 as including content customization system 402, user management system 404, evaluation system 406 and content delivery system 408, one or more of the systems (or corresponding or similar systems) may also or alternatively reside on a different device. For example, a user device (e.g., executing an executable file) and/or relay device may include an evaluation system, and/or a relay device may include a user management system 404 and/or content delivery system 408.

A processing management server 102 also may include a user management system 404. The user management system 404 may be implemented using dedicated hardware within the network 100a (e.g., a user management server 404), or using designated hardware and software resources within a shared processing management server 102. In some embodiments, the user management system 404 may monitor the progress of users through various types of content resources and groups. For example, the user management system 404 may query one or more databases and/or data store servers 104 to retrieve user data such as associated content compilations or programs, content completion status, user goals, results, and the like.

A processing management server 102 also may include an evaluation system 406. The evaluation system 406 may be implemented using dedicated hardware within the network 100a (e.g., an evaluation server 406), or using designated hardware and software resources within a shared processing management server 102. The evaluation system 406 may be configured to receive and analyze information from level-1 devices 106. For example, various ratings of content resources submitted by users may be compiled and analyzed, and then stored in a data store (e.g., a electronic object data store 303 and/or evaluation data store 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100a. The evaluation system 406 also may receive and analyze user evaluation data from level-1 devices 106, level-2 devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, comprehension levels, effectiveness levels, gamer skill levels, etc.).

A processing management server 102 also may include a content delivery system 408. The content delivery system 408 may be implemented using dedicated hardware within the network 100a (e.g., a content delivery server 408), or using designated hardware and software resources within a shared processing management server 102. The content delivery system 408 may receive content resources from the content customization system 402 and/or from the user management system 404, and provide the resources to level-1 devices 106. The content delivery system 408 may determine the appropriate presentation format for the content resources based on the user characteristics and preferences, and/or the device capabilities of level-1 devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100a. The security and integration layer 410 may include some or all of the security and integration components 208 discussed above in FIG. 2, and may control the transmission of content resources and other data, as well as the receipt of requests and content interactions, to and from the level-1 devices 106, level-2 devices 110, administrative servers 116, and other devices in the network 100a.

Figure 4B:
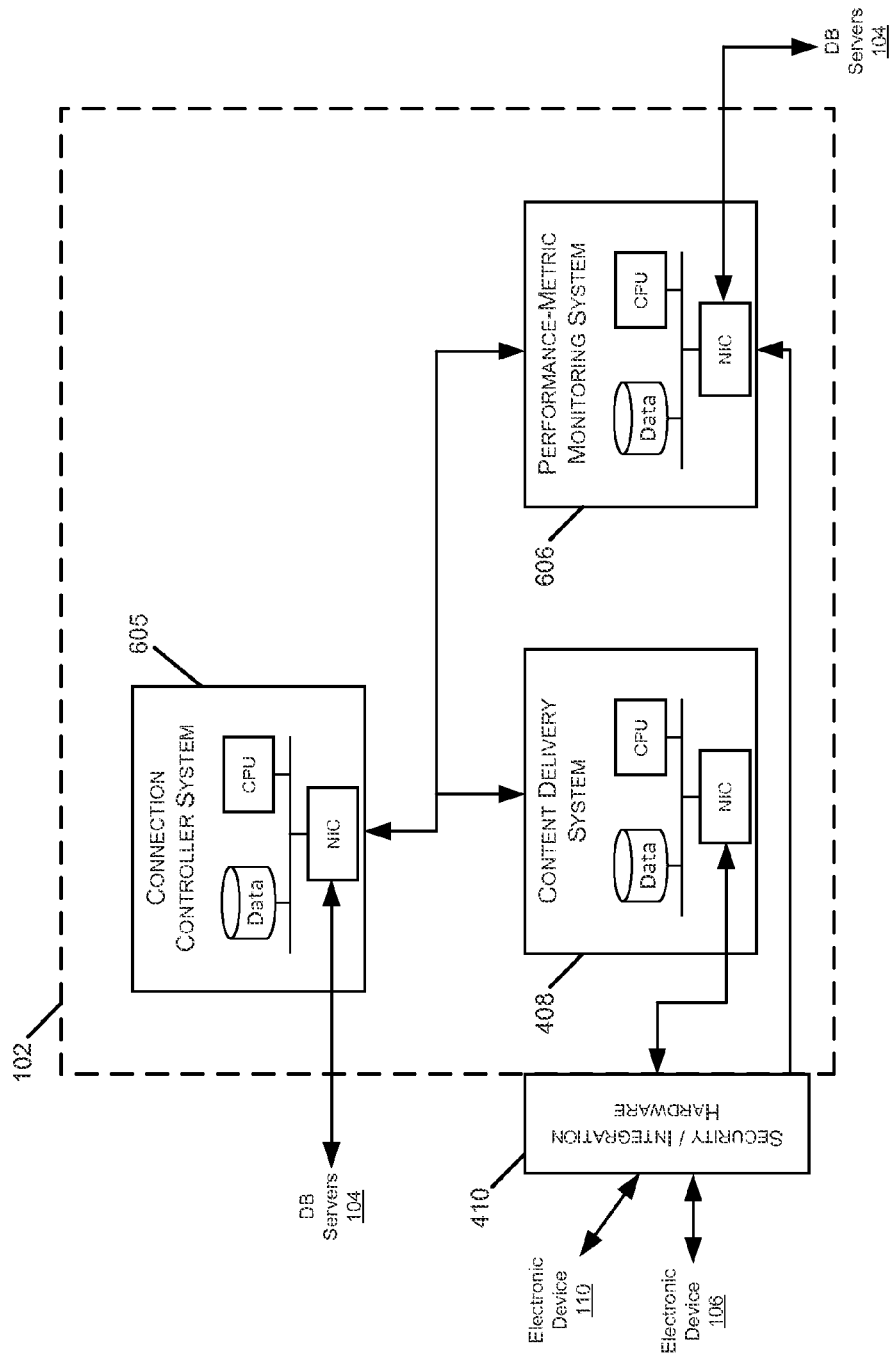

FIG. 4B is a block diagram illustrating an embodiment of one or more processing management servers 102 within a network (e.g., a content distribution network (CDN), device-connection network, and/or task-performance network). Processing management server 102 includes various specialized subsystems (connection controller system 605, content delivery system 408 and performance-metric monitoring system 606). Each of one, more or all of the subsystems may be independent from one or all other subsystems. Each subsystem may include, for example, a server, server farm, a cluster, a receiver and/or transmitter, one or more processors and/or one or more local memories and/or storages. In various instances, two or more of the subsystems may differ in terms of which data and/or data store is made accessible to the subsystem for reading, querying and/or writing. For example, performance-metric monitoring system 606 may be selectively authorized to store performance metrics in an evaluation data store and/or connection controller system 605 may be selectively authorized to store connection-channel definition parameters in a network data store.

Connection controller system 605 can include a system configured to define, establish (or facilitate establishment of), monitor and/or update one or more connection channels within the network. Each connection channel may connect multiple agent devices. In one instance, each connection channel is between a device (e.g., a Level-1 electronic device) of a first "lead" agent and a device (e.g., Level-1 electronic device) of a second "focus" agent. In one instance, a first lead agent device may be connected to multiple second focus agent devices.

In various instances, a connection between a lead agent device and a focus agent device may—or may not—be asymmetrical, in that different authorizations and/or data availing is provided to the agent devices. For example, a lead agent device may be allowed to access more electronic content objects than a focus agent device. In some instances, a lead designation permits an agent device to identify tasks to be sent to a focus agent device.

A configuration of a connection channel (e.g., agent and/or device designations as a "lead" or "focus") may be defined based on one or more connection constraints. For example, a constraint may include a location constraint that specifies an absolute and/or functional distance threshold that locations of multiple agent devices must be within relative to each other and/or an absolute or functional area (e.g., specified building or any zip code) that agent devices must be within. As another example, a constraint may include one or more thresholds or other specifications for agents' performance metrics, such as specifying than a performance metric of an agent of a connection is to be below a first threshold and/or a performance metric of another agent of a connection is to be above a second threshold. As yet another example, a constraint may include a connectivity constraint that identifies a type of connection (and/or connection strength) that agent devices must have.

A configuration of a connection channel may alternatively or additionally be defined based on data collected from individual devices' sensors and/or receivers. For example, a condition may specify a type of data that is required in order for a given agent device to receive a particular agent designation and/or to be involved in any and/or a particular type of connection channel. To illustrate, a condition may specify that one or more agents are to have recent accelerometer readings (or statistics based thereupon) below a defined threshold in order to be added to any inter-agent connection channel. As another example, a condition may specify that GPS signals received at agent device receivers (or signals from other source transmitters, such as WiFi access points) are to indicate that multiple agent devices are located within a defined distance threshold from each other before the agent devices are connected via a connection channel.

A push or pull technique may be used to enable pertinent data to be transmitted from agent devices to connection controller system 605. For example, connection controller system 605 may request one or more types of particular sensor data from each of a set of devices upon detecting (for example) a particular time or connection request (e.g., from a Level-1 or Level-2 agent device). As another example, an application operating on each of one or more agent devices may trigger periodic transmission of sensor or location data to connection controller system 605, which may store this data in association with an identifier of the agent device.

Connection controller system 605 may facilitate establishment of a connection channel, for example, by generating a communication to be transmitted to a first agent device identified for the channel that includes an address of a second agent device identified for the channel. The communication may also include, for example, an instruction to establish a connection between the two devices. In one instance, connection controller system 605 acts as an intermediary of the connection, such that it routes communications from one of the devices of the connection to another of the devices of the connection. An advantage of this approach is that connection controller system 605 may obscure and/or add pertinent data to communications during the routing. For example, communications routed from a source agent device routed to a second device may be stripped of an identifier of a source agent and/or agent device.

Connection controller system 605 may monitor connection channels by, for example, monitoring statuses of agent devices of the channel. For example, connection controller system 605 may determine whether any communication has been received by an agent device within a defined threshold time period, and—if not—change a status of the agent device from "active" to "unresponsive". In some instances, monitoring a connection channel includes monitoring performance metrics generated in association with the channel. For example, it may be required that—in order to maintain a connection channel and/or agent designation—one or more performance metrics (or a statistic based thereupon) or a change in a performance metric or statistic exceed a threshold at a defined relative or absolute time.

In some instances, monitoring a connection channel includes determining whether and/or which tasks have been completed by one or multiple agents involved in the channel. Tasks may include those automatically assigned to be completed by agent devices in the channel and/or one or more tasks as identified by an agent involved in the channel. A task may involve an electronic content object. For example, a task may include presenting an electronic content object, receiving inputs responsive to presentation of an electronic content object and/or identifying a response to a query as set forth in an (e.g., assessment) electronic content object.

To determine whether a task has been completed, connection controller system 605 may determine whether an electronic content object associated with a task had been requested or delivered to a particular agent device. The content delivery system 408 may maintain an access log that stores request and/or object-transmission data in association with identifiers (e.g., of or associated with an electronic device and/or content-object identifier). The access log can then be queried with a particular identifier or identifiers to determine whether a request or provision had been made. In an alternative or additional approach to tracking object access via access-log queries, content delivery system 408 may transmit a notification to connection controller system 605 upon receiving a request for an object or providing an object.

The notification may include, for example, a time, an identifier of the electronic device and/or an object identifier.

Instead of or in addition to monitoring performance via content-object access, connection controller system 605 may determine whether a task result has been generated and stored. Performance-metric management system 606 (which may include and/or include similar features to evaluation system 406) can receive processing results directly or indirectly from agent devices. The results may be stored in association with, for example, an identifier of an electronic device (e.g., at which the result was identified), a time, an identifier of a content object, and/or an identifier of a task. Performance-metric management system 606 may store this data (e.g., via a database server 104) and/or may alert connection controller system 605 of the detection of the result (e.g., and/or associated identifiers). The alert may be provided in response to the result detection and/or upon receiving a request from connection controller system 605. In some instances, connection controller system 605 itself received a task result (e.g., via a communication routed through an established connection channel). Connection controller system 605 may detect that a (and/or which) task result has been received and may transmit the result with associated identifiers (e.g., of a channel, agent device, task and/or time) to performance-metric monitoring system 606, which may generate a performance metric based on the result.

Performance-metric monitoring system 606 may generate periodic performance metrics for each agent, agent device and/or connection channel. A performance metric may be, for example, associated with a given task, set of tasks, communication session, and/or time period. An example of a performance metric can include a numeric or non-numeric (e.g., categorical) score for an electronic or non-electronic assessment. In one instance, a performance metric may be one associated with performance that it temporally separated from use of a given connection channel. For example, a communication may be received from another (e.g., Level-2) agent device that identifies a performance metric of a focus agent device (and/or lead agent device) (e.g., indicative of performance in a course and/or on an evaluation). In one instance, a performance metric may be generated by determining whether a processing result matches, includes or otherwise corresponds to a target result (e.g., identified by electronic data associated with a content object and/or task, such as a key).

Content delivery system 408 may provide electronic content objects (and/or data sets that include data for availing an electronic content object) to one, more or each agent device associated within a connection channel. The electronic content object can include one identified by and/or selected at an agent device and/or included in a request received at content delivery system 408 (e.g., from an agent device directly or indirectly via, e.g., connection controller system 605). Alternatively or additionally, the electronic content object can include one identified by a task assigned to one or more agent devices of a connection channel or to the connection channel itself.

When a given content object is provided to multiple agent devices, a same or different version of the object may be provided. For example, a version of a content object provided to one agent device (e.g., a lead agent device) may include data that is not in a version of the content object provided to another agent device (e.g., a focus agent device). The electronic content object may include one or more queries (e.g., multiple-choice or essay questions) and/or a configuration so as to accept a response to the one or more queries. Such accepted responses may be evaluated, for example, by performance-metric monitoring system 606 so as to identify a performance metric.

Figure 5A:
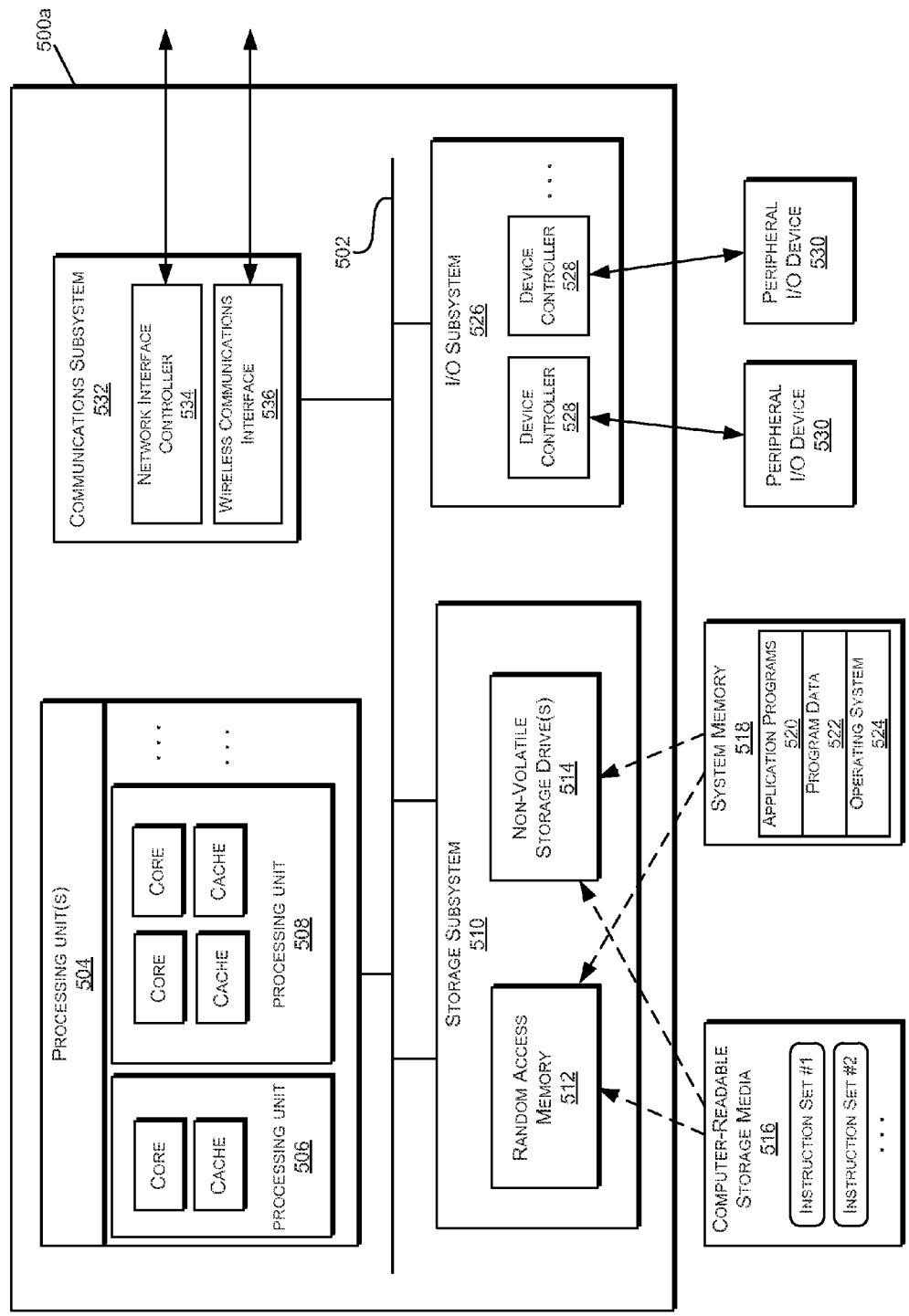
FIGS. 5A and 5B are block diagrams illustrating the physical and logical components of a special-purpose computer device within a network.

With reference now to FIG. 5A, a block diagram of an illustrative computer system is shown. The system 500a may correspond to any of the computing devices or servers of the network 100a described above, or any other computing devices described herein. In one instance, an agent device includes some or all of the components of system 500a. In this example, computer system 500a includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500a communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500a. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater).

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500a may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500a (e.g., integrated audio/video systems, and/or touchscreen displays), or may be separate peripheral devices which are attachable/detachable from the computer system 500a.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, projection devices, touch screens, and the like. In general, use of the term "output device" is intended to include all possible types of devices and mechanisms for outputting information from computer system 500a to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500a may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500a, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500a, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500a.

By way of example, computer-readable storage media 516 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500a.

Communications subsystem 532 may provide a communication interface from computer system 500a and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500a via a computer network, a FireWire® bus, or the like, and/or may be physically integrated onto a motherboard of the computer system 500a. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500a. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 309). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500a.

Due to the ever-changing nature of computers and networks, the description of computer system 500a depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 5B:
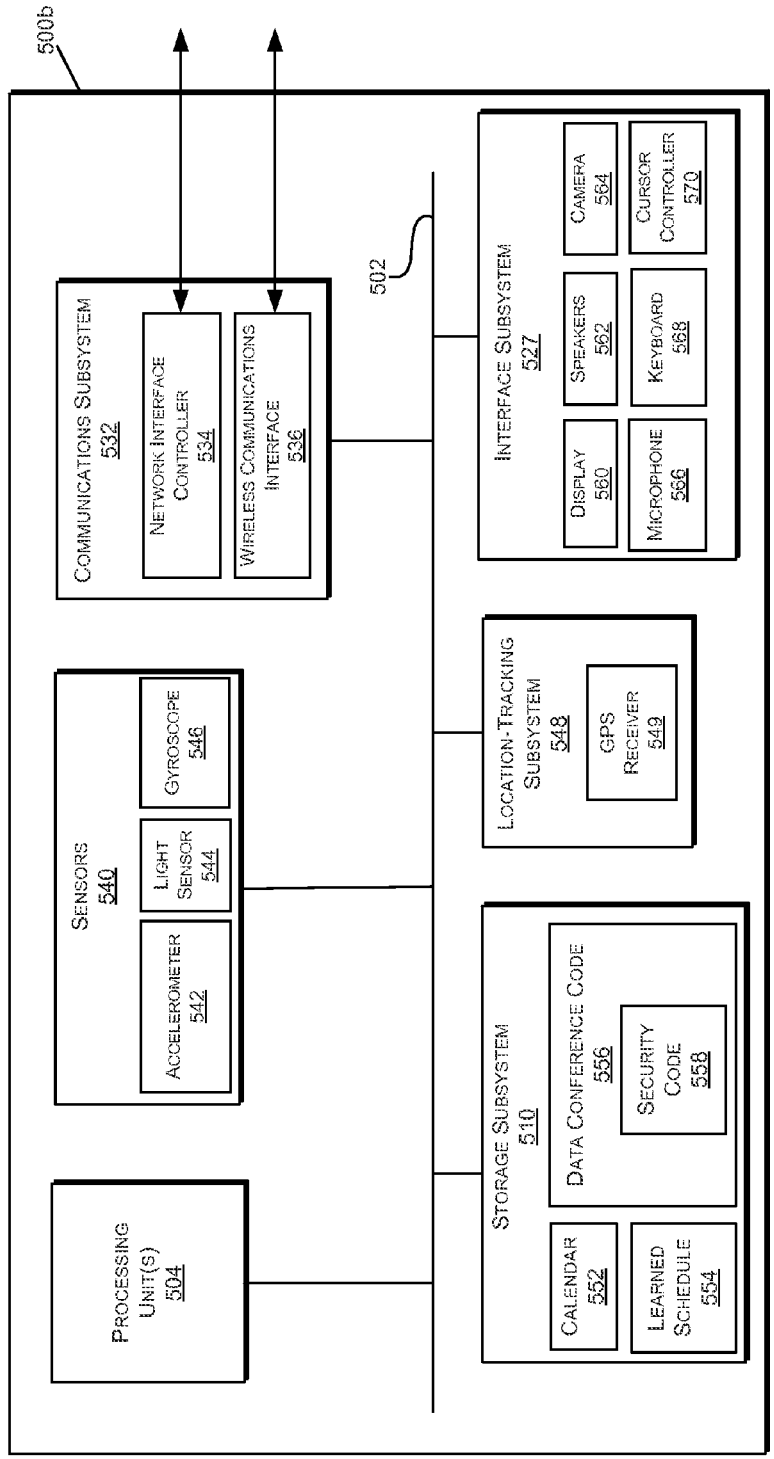

With reference now to FIG. 5B, a block diagram of an illustrative computer system is shown. The system 500b may correspond to any of the computing devices or servers of the network 100a described above, or any other computing devices described herein. In one instance, an agent device includes some or all of the components of system 500a. It will be appreciated that a device or server disclosed herein may include one or more first features shown and/or described with respect to system 500a and/or one or more second features shown and/or described with respect to system 500b.

In the depicted instance, system 500b includes a plurality of sensors 540 that are configured to detect environmental and/or intrinsic stimuli and/or device characteristics. Sensors 540 include an accelerometer 542, light sensor 544 and gyroscope 546. Accelerometer 542 may be configured to repeatedly and/or upon request detect an acceleration of part or all of system 500b along one or more directions (e.g., along three axes). Light sensor 544 can include, for example, a photosensor or photodetector and can be configured to detect a presence, intensity and/or type (e.g., wavelength) of ambient light. Gyroscope 546 can be configured to detect an orientation of part or all of system 500b. It will be appreciated that a device 500b can include one or more other sensors that detect a presence, intensity and/or type of environmental stimulus and/or characteristic of device 500b.

System 500b also includes a location-tracking subsystem 548 that includes a GPS receiver 549 configured to received GPS signals from GPS satellites. It will be appreciated that location-tracking subsystem 548 may further or alternatively include a receiver that receives signals from other types of signal sources (e.g., with identifiable locations), such as access points and/or cell towers. The content, receipt time and/or signal strength of one or more signals can be used to estimate a location (e.g., geographic coordinates) of system 500b. For example, a module or app in storage subsystem 510 may process received signals using a triangulation technique to estimate a location.

One or more sensors may be configured to detect a stimulus characteristics (e.g., presence, intensity, direction and/or type) and/or location-tracking subsystem 548 can be configured to receive signals (e.g., GPS signals, access-point signals, etc.), for example, at defined times or time intervals, in response to detection of an intrinsic or external request and/or in response to detecting a satisfaction of a condition (e.g., a change in power state or detecting that a value of another stimulus exceeded a threshold). Sensor measurements, GPS signals and/or location estimates may be evaluated locally and/or included (e.g., in raw or processed form) in communications transmitted to other devices.

Storage subsystem 510 may again include hardware and software components used for storing data and program instructions, such as system memory 518 and computer-readable storage media 516 shown in FIG. 5A. Storage subsystem 552 includes a calendar 552 that includes electronic representations of appointments, events, meetings, deadlines and so on. Each of one, more or all of the representations may be associated with a name, start time (e.g., date and time of day), end time, duration, location and/or other participant(s). The representations may include, for example, ones set by a first user of system 500b, set by a second user of another device (e.g., and transmitted to system 500b or another first-user-associated device), and/or automatically identified (e.g., based on a country-, institution-, time-zone-, or activity-related calendar or other calendar). Calendar 552 can include one that is configured to be editable locally at system 500b or that is managed remotely but mirrored at system 500b via transmissions. For example, in the latter instance, in response to detecting a user action to add a calendar event, system 500b may transmit pertinent event details to a remote server, which may update the calendar, and a local version of the calendar may be updated directly in response to the input or upon receiving a confirmation communication from the remote server.

It will be appreciated that, in addition to including calendar-element data, a calendar subsystem may include code configured to generate or modify (e.g., based on input and/or communications) the calendar and/or present calendar data. A calendar subsystem may further include configured to transmit calendar data (e.g., filtered or unfiltered specifications of current, upcoming and/or all calendar elements) to another system (e.g., processing management server 102). For example, at regular and/or defined times and/or in response to a request, system 500b may generate a transmission that indicates whether any calendar element is identified as being ongoing at that time.

Storage subsystem 510 also includes a learned schedule 554. Similar to the representations of calendar 552, learned schedule 554 can include electronic representations that may be associated with a name, start time, end time, duration, location and/or other participant(s). However, elements of learned schedule 554 are identified based on analysis of past data. For example, a learning subsystem may associate sensor measurements, location estimates, device usage and/or device states (e.g., screen and/or power states) with particular times and determine whether patterns emerge. For example, repeated instances of low acceleration measurements and screen-off statuses during a particular time period may be used to add an "unavailable" element in learned schedule 554 during that time period. The schedule may be learned, for example, using a (e.g., supervised) machine-learning technique (e.g., neural network technique, support vector machine or clustering technique) or pattern-detection technique. Learned schedule 554 can include one that is configured to be modifiable locally at system 500*b* or that is managed remotely but mirrored at system 500*b* via transmissions.

Storage subsystem 510 further includes a data conference code 556 configured to facilitate establishing, maintaining, updating, closing and/or using connection channels with another device (e.g., an agent device). In some instances, data collected from one or more sensors 540 and/or location-tracking subsystem 548 and/or data included in calendar 552 and/or learned schedule 554 to determine and/or predict an availability to participate in a data conference (e.g., as indicated by a lack of calendar appointments and meetings, a location inferred to be a user's home, motion data indicating that the user device is not quickly moving, and/or light-sensor data detecting light signals consistent with daylight). Data conference code 556 may further use correlations between empirical sensor, calendar, schedule and/or location data and empirical performance metrics to identify data predictive of low or high performance metrics.

Data conference code 556 may generate a communication that includes collected data, predicted availability, predicted performance metrics, identifier of system 500*b*, agent associated with system 500*b*, and/or time. Communications subsystem 532 can transmit the communication to, e.g., a processing management server 102 and/or another device (e.g., a nearby agent device). Communications may be generated and/or transmitted, for example, at defined times or time intervals, upon request, or upon data conference code 556 detecting that a condition is satisfied (e.g., that a sensor value exceeds a threshold, that a user is predicted as being available, that an input has requested an initiation of a data conference, etc.).

Transmission of such a communication may facilitate determining whether to establish a connection channel between system 500*b* and another device and/or specifics for the channel (e.g., which other device to include in the connection channel). For example, a complementary-channel configuration may indicate that, if a communication identifies a predicted (or actual) high performance metric associated with system 500*b*, system 500*b* is to be connected with another device associated with a predicted or actual low performance metric. The other device may be identified, for example, to bias towards or such that a difference in predicted or past performance metrics exceeds a defined threshold, that at least a threshold standard deviation in performance metrics across devices in the channel is met, so as to maximize or bias towards performance-metric differences between all of a set of pairings being established, and so on. As another (alternative or additional) example, a channel may be established so as to be associated with a relatively high (e.g., above an absolute or relative threshold) predicted change in a performance metric associated with one or each device (or system) included in the channel. The prediction may be made based on empirical data that identifies specifications of past connections with a given device or system and performance-metric changes. Upon identifying another device that system 500*b* is to connect to via a connection channel, a communication may be transmitted (e.g., from processing management server 102 and/or an agent device near system 500*b*) to system 500*b* that identifies the other device and/or that includes a request or instructions for joining (or establishing) a connection channel.

In one instance, system 500*b* determines whether to establish a channel and/or with which device to connect to via a connection channel. For example, communications subsystem 532 may detect multiple other devices, via (for example) WiFi, in response to a broadcast signal, or via a short-range network (e.g., Bluetooth or Bluetooth Low Energy) or even be directed to a communication channel choice via NFC (near field communication), RFID (radio-frequency identification), or QR (quick response) codes. An initial communication from each of the other devices may include data indicative of a performance metric associated with the device or corresponding agent, a specification associated with the device or corresponding agent, a type task requested to engage in via a connection channel, and so on. This information may be included directly in a communication or, for example, may be associated with an identifier (e.g., of a device or agent) that is included in the communication. System 500*b* may then determine whether to participate in a connection channel with a particular other device and/or which other device to participate in a connection channel with based on the information.

A connection channel can include a wireless or wired channel through which electronic messages can be exchanged between devices (or systems) involved in the channel. Electronic messages may be directly communicated between endpoints of the channel (e.g., using any network components, such as routers) or may be indirectly communicated via an intermediate system (e.g., via processing management server 102). Electronic messages can include, for example, data corresponding to input (e.g., typed characters and/or cursor selections) received at a device, metadata (e.g., including a device identifier, details about what is being presented at a device, sensor data, etc.), a task specification and/or a task result. Communications may be formatted according to one or more defined standards and including a defined type of data.

The communications may be generated, formatted and/or transmitted (e.g., via data conference code 556) so as to establish a data conference between devices (or systems) of the channel. A data conference may be established, for example, to facilitate a uni- or bi-directional and/or real-time transmission of a particular type of data. In one instance, a data conference includes a screen share, whereby an interaction (e.g., with an electronic whiteboard, content presentation, electronic assessments, and so on) detected at one endpoint of the channel is represented at another endpoint of the channel. An interaction may include, for example, making a selection (e.g., of one of a plurality of available response options), a cursor movement, entering text or numbers, or scrolling. In some instances, the data conference enables a first endpoint device (or system) to represent an effect of an interaction detected at a second endpoint device (or system). For example, an agent (e.g., a lead agent) at a first endpoint may select a task or electronic content object, and a representation of the task or the electronic content object may be presented at the other endpoint device (e.g., and, in some instances, also at the first endpoint device).

Data conference code 556 can include a security code 558 that implements security features of communication connections and filters or obscures select data. For example, security code 558 may include code for encrypting outgoing communications, decrypting incoming communications, and/or using a secure transport protocol. As another example, security code 558 may include data-access restrictions that, for example, ensure that select interface data (e.g., outside of a particular app or screen) are not transmitted via a connection channel and/or that limits a degree to which another endpoint device may control operation of system 500b.

In some instances, communications transmitted via a connection channel can include data detected via an input component of system 500b (or processed version thereof), and/or communications received via a connection channel can include data that is presented or that influences a presentation via an output component of system 500b. Interface subsystem 527 includes various input and output components.

Exemplary output components can include a display 560 and speakers 562. Display 560 can include a visual display, such as an LCD or retina display, configured to visually display presentation outputs (e.g., screens, text, numbers, webpages, app pages, cursor positions, or electronic content objects). Speakers 562 can include a electroacoustic component that can present audio signals, such as speech or music. Outputs presented via an output component may include, for example, signals (e.g., voice signals) received from another input of a connection channel), electronic content objects (e.g., received via a remote endpoint device or server or retrieved from a local data store based on an object identification included in a communication), visual representations of interactions occurring at another device (e.g., text being entered into a field of a content object, a message or chat or cursor movements), visual representations of messages included in communications, or presentations of image or video signals included in a communication or content object (e.g., a video feed from another endpoint device)

Exemplary input components can include camera 564, microphone 566, keyboard 568, and cursor controller 570. Camera 564 can include a lens, an enclosed box, a shutter and/or electronic sensor. The lens may focus light, which may then enter the enclosed box, and the sensor can then record an image. The shutter may be electronically controlled to as to constrain a time during which light enters the camera. Camera 564 may further include a light source or flash that may emit light prior to and/or during image collection. Camera 564 may be configured to capture still images and/or videos, which may be collected via recording a series of images or frames. The frame series may be synchronized with an audio signal, captured via microphone 566. Image or video data can be transformed into electronic representations, such as jpgs, gifs, tiffs, wmvs, mp4s, avis, movs, etc.

Microphone 566 can be configured to convert audio signals into electrical signals. For example, pressure variations may be converted into electrical signals via piezoelectricity, capacitance change, or electromagnetic induction. In some instances, microphone 566 includes a diaphragm that converts sound into mechanical motion; a housing; an amplifier; a piezoelectric crystal; an induction coil; and/or capacitor.

Keyboard 568 can include a wired or wireless keyboard configured to transform mechanical inputs corresponding to particular physical or virtual keys into characters, symbols, numbers, words or actions. Cursor controller 570 can include a component that can translate movements, taps, etc. into positions along a display. Exemplary cursor controllers 570 include a mouse, trackpad, or input component of a touchscreen (e.g., which thus serve as an input component and an output component).

Figure 6:
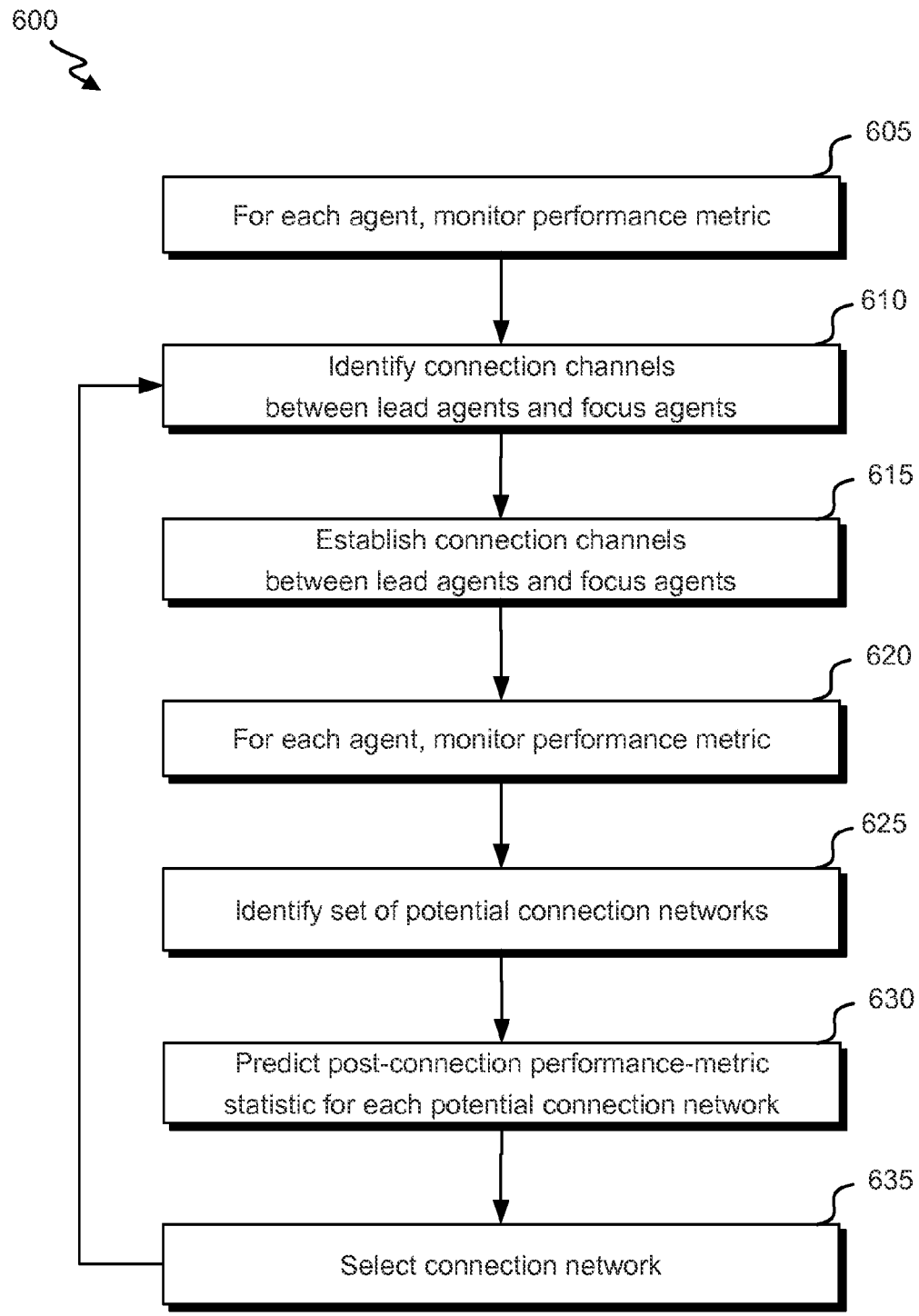
FIG. 6 illustrates a flowchart of an embodiment of a process 600 for establishing connection channels between agent devices.

FIG. 6 illustrates a flowchart of an embodiment of a process 600 for establishing connection channels between agent devices. Part or all of process 600 can be performed by. Process 600 begins at block 605 where performance-metric monitoring system 606 monitors a performance metric for each agent. The performance metric can include and/or be based on, for example, a score received on a previously administered electronic or non-electronic assessment (or processed version thereof, such as a weighted or unweighted average of multiple scores) and/or a metric identified via input received at another device (e.g., a level-2 device) and/or transmitted to a server by that device. The performance metric may pertain to (for example) a particular time period (e.g., year or fraction thereof), course, type of task, institution and/or content object. A performance metric can include on configured to be updated (e.g., in response to detection of other local or remote inputs or communications and/or query or assessment responses) or discrete.

At block 610, connection controller system 605 identifies one or more connection channels, each of which bridges one or more lead agents with one or more focus agents. The identification can be based on the performance metrics and can include identifying a complementary correspondence for multiple or each agent. In one instance, a single lead agent is to correspond to a single focus agent at a given time point or during a particular time period. In one instance, a single lead agent can correspond to multiple focus agents and/or the converse.

Identifying these "lead" or "focus" designations may be performed by evaluating one or more performance metrics identified via block 605. In one instance, a device of each of a set of agents is to be connected (e.g., wirelessly or via a wired channel) via a connection channel to a device of each of one or more agents (e.g., a single other agent, a defined number of other agents and/or a number of agents exceeding in a defined direction one or more defined ranges) in the set of agents. In one instance, one or more (e.g., one, a defined number, or each for which a condition is satisfied) agents are identified for which a device of (each of) the agent(s) is to be connected to a particular agent device. The particular agent device can include, for example, one that requested to participate in a connection channel or one associated with a performance metric for which a condition is satisfied (e.g., that is below a defined threshold or that dropped by an amount below a defined threshold). Thus, depending on the instance, device identifications for inclusion in connection channels may be determined based on a device-centric or population basis.

Lead and focus agents may differ with regard to, for example, a level of authorization. For example, a lead agent may be able to access more electronic content objects than a focus agent and/or to assign one or more tasks to the focus agent (e.g., while the focus agent may not be able to assign any tasks to the lead agent and/or may be more limited in task-assigning ability). To illustrate, a lead agent may serve as a tutor to the focus agent, so as to control a structure of a communication exchange, objectives, tasks and/or performance priorities. As another (additional or alternative) example, a lead agent may be able to access data pertaining to the focus agent that is not reciprocal (e.g., such that the focus agent is not authorized to access corresponding data pertaining to the lead agent). For example, a lead agent may be able to gain access to one or more responses, current performance metric(s), and/or performance-metric statistics pertaining to the focus agent device (while the converse need not be true).

Block 610 can include identifying one or more agent sets, of which at least one agent is designated as a lead agent and at least one as a focus agent. For each set, devices of agents in the set can then be connected via a connection channel. Various techniques can be used to identify which agents to include in a given set. In one instance, a set of considered agents is first identified (e.g., those not already included in an inter-agent connection channel, within a defined proximity from a given agent device, and/or within a particular course), and a score is generated for each considered agent. The score may depend, for example, on a difference between a performance metric or performance-metric statistic of the considered agent and that of a particular agent; a distance between a device of the considered agent and a device of the particular agent; magnitudes of past performance-metric improvements detected with respect to complementary agents engaged in a connection channel with the considered agent; future availability and so on. An agent can then be selected to be included (or conditionally included, such as being included upon accepting a channel request) in a connection channel with the considered agent based on the scores. For example, the considered agent with a highest score may be selected or an agent may be pseudo-randomly selected from amongst those associated with scores above a defined threshold.

In one instance, a population-based approach can be used to identify groups (e.g., of two, a defined number, or within a range) of agents within a set of agents according to an optimization technique. To illustrate, a plurality of potential networks can first be identified (with each potential network including a plurality of groups). For each group and each potential network, a performance-discrepancy value can be identified (e.g., a difference between performance metrics of performance-metric statistics for agents in the group). For each potential network, a performance-discrepancy statistic can be determined based on the values (e.g., an average, median, mode, minimum, or other statistic). A network can then be selected from amongst the plurality of potential networks based on the performance-discrepancy statistic (e.g., to select a network selected with a maximum relative to the other determined statistics). Groups can then be identified as those of the network.

In one instance, a predictive technique can be used. A data element may be generated for each agent that is indicative of agent specifications, such as languages, preferences (e.g., with regard to communication type, electronic content-object type, or audio versus visual communication), past connection-channel times, time zone, institution, gender, age and so on. Data element specifications may be learned (e.g., based on data in communications exchanged via a past connection channel) and/or identified via input (e.g., at a device of the agent or at a device of another agent, such as a Level-2 agent). The data element may further include one or more weights that are indicative of whether (and/or how) changes of a performance metric of the agent associated with the data element depended on various agent specifications. The weights and specifications may then be used to generate a predicted outcome (e.g., related to performance-metric increases) of connecting two agents. Considering various potential connections can then be evaluated for a particular device or for a set of devices, as discussed herein.

Identifying which agent is a lead agent or focus agent may be performed while identifying connection channels or may be performed separately. In one instance, an agent associated with a higher performance metric or performance-metric statistic within a group is identified as a lead agent and another as a focus agent.

At block 615, connection controller system 605 establishes the one or more connection channels identified at block 610. Each connection channel (in some embodiments) may connect a device of a lead agent and a device of a focus agent. Establishing a connection component can include, for example, transmitting one or more communications to one, more or each agent in the connection channel that identifies an agent (e.g., by name, email address or obscured identifier) or device of an agent (e.g., by device identifier) also to be included in the connection channel. The one or more communications may include a request and/or instruction to participate in the connection channel. The one or more communications may include, for example, an address of a webpage or app page via which the agent devices can communicate; a task to be processed (e.g., assessment to be worked on or completed) via the connection component; a content object to be reviewed and/or presented during a communication exchange and/or information about the other agent. The one or more communications may include instructions to present a shared whiteboard (e.g., via an app) and/or establish an audio component of the connection channel (e.g., via phone).

At block 620, performance-metric monitoring system 606 again monitors performance metrics for each agent. The performance metrics may be, for example, of a similar or same type or may be the same as those monitored at block 605. The monitoring may occur in a similar fashion to the monitoring performed at block 605. In some instances, the monitoring may include monitoring (and/or determining) performance metrics based on data exchanges, interactions and/or responses provided in the connection channels established at block 615. In some instances, the monitoring includes identifying a change in a performance metric or a performance metric associated with a time after use of a connection channel established at block 615.

At block 625, connection controller system 605 identifies a set of potential connection networks. Each of the set of potential connection networks can include one or more connection channels, which may be defined based on endpoint devices to be (potentially) included in the channel and/or a designation of an endpoint device (e.g., as a focus or lead agent device).

At block 630, performance-metric monitoring system 606 predicts a post-connection performance-metric statistic for each of the set of potential connection networks. For example, for each potential connection network, a post-connection performance metric can be predicted for each connection channel in the potential network (e.g., based on one or more specifications and/or weights in the data element of each of one or more agents; based on derived relationships indicating how pairing characteristics, such as inter-agent discrepancies, are predictive of performance; and so on). The post-connection performance metric may be relative (e.g., a change in a performance metric or performance-metric statistic relative to a corresponding pre-connection value) or absolute. The post-connection performance metric may be based on a predicted performance of one (e.g., a focus agent), more or each agent involved in the connection. For each potential network, a post-connection performance-metric statistic may be generated based on the post-connection performance metrics associated with the groupings included in the network. The statistic may include, for example, an average, median, mode, minimum, standard deviation or other statistic.

At block 635, connection controller system 605 selects a connection network from the set of potential connection networks based on the predicted post-connection performance metrics. For example, a network associated with a maximum average statistic (relative to statistics of other potential networks) or with a minimum standard-deviation statistic may be selected. In some instances, the selection is based on a weighting (e.g., applied to each of one or more post-connection performance-metric statistics and/or one or more other factors). For example, the selection may also be based on a degree to which a potential network would disrupt existing connection channels.

Process 600 then returns to block 610 where the connection channels are again identified. The connection channels can include those in the selected connection network. Process 600 can continue to repeat some or all of blocks 610-635 for a defined time period, until connection requests cease to be detected and/or until an instruction is received to cease network updating. The iterative connection-channel identification can allow for connection networks to be repeatedly and dynamically updated so as to promote efficient and effective connection channels. Such techniques can promote high performance from particular agents and/or a population of agents.

Figure 7:
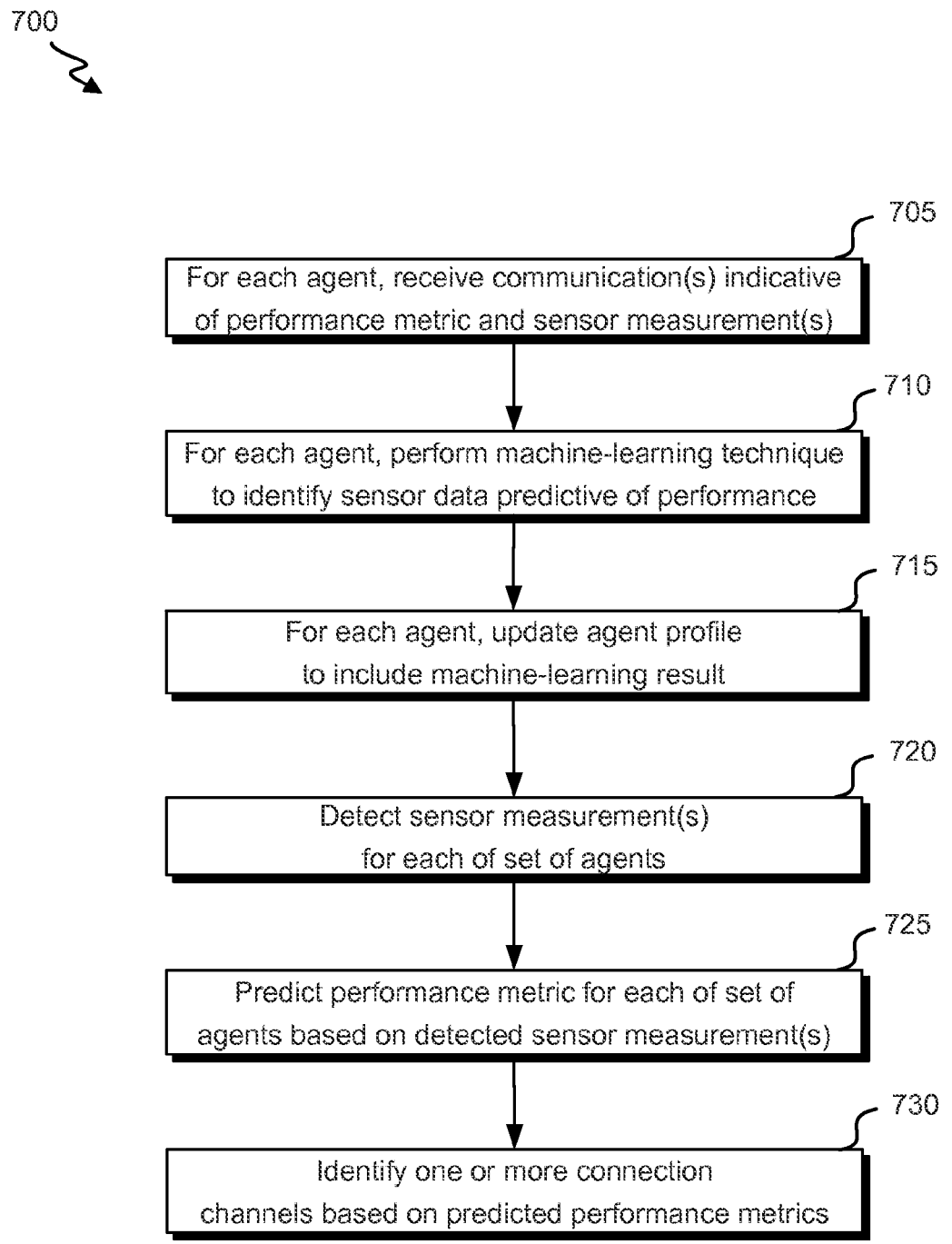
FIG. 7 illustrates a flowchart of an embodiment of a process 700 for identifying a configuration for a connection channel between agent devices.

FIG. 7 illustrates a flowchart of an embodiment of a process 700 for identifying a configuration for a connection channel between agent devices. Part or all of process 700 can be performed by performance-metric monitoring system 606. Process 700 begins at block 705 where performance-metric monitoring system 606 receives (e.g., directly or via connection controller system 605), for each of a set of agents, one or more communication that is indicative of a performance metric associated with the agent and/or one or more sensor measurements. The one or more communications may be received during a same time period (e.g., within a minute) or at various times. The communication(s) may be received, for example, in response to a request for the data or as part of a defined transmission scheme (e.g., indicating that such communications are to be transmitted at one or more defined times or upon detecting one or more events, such as detecting a response to each of one or more queries).

In some instances, a communication that is indicative of a performance metric of a particular agent is received from a device of that agent. In some instances, it is received from another device (e.g., a second agent device connected to the device of the agent via a connection channel or a Level-2 agent device);

The communication may be indicative of a performance metric by, for example, including the performance metric or including a response to an electronic or non-electronic query (e.g., which can be evaluated to determine whether and/or an extent to which it is correct, which itself may be a performance metric or may contribute to a performance metric). Thus, the performance metric may include one identified at an agent device or one identified as, for example, performance-metric monitoring system 606 based on a performance result or query response detected at the agent device. In one instance, one or more (same or different) queries is presented (e.g., via an app executing on an agent device or via a webpage) at an agent device at each of a plurality of times. Each time may be associated with corresponding sensor measurements (from a same or similar time point) and/or a response provided (e.g., and detected by an input component of the agent device) or lack of response may be assessed to determine the performance metric.

The sensor measurement(s) may include, for example, data from a light sensor, accelerometer, heart rate, gyroscope and/or light sensor or a processed version thereof (e.g., an average, an inferred motion state or an inferred type of user activity). The sensor measurement(s) can include one(s) collected, for example, associated with (e.g., during or just before) a time period during which a user was performing a task that gave rise to the data supporting a performance metric. For example, the sensor measurement(s) can include those from a five-minute period preceding presentation of a query, for which a response is indicative (by itself or in combination with other responses from a same agent) of a performance metric.

At block 710, for each of the set of agents, performance-metric monitoring system 606 uses a machine-learning technique to process the data received at block 705 to identify sensor data that is predictive of performance. The machine-learning technique may include, for example, a neural-network technique, a clustering technique, or a support vector technique. The technique may produce, for example, one or more thresholds, ranges, weightings, logic functions and/or linear or non-linear functions.

In one instance, performing the technique includes defining inputs as corresponding to numeric measurements from one or more sensors and defining outputs as corresponding to numeric, binary or categorical performance metric (e.g., a response matching a key value, a portion of responses identified as be accurate or a grade identified via input). The technique may be repeatedly performed so as to adjust which measurements are identified as being performance predictive (and/or how) as new data is received.

It will be appreciated that other techniques, besides or in addition to a machine-learning technique, may be used to identify sensor data predictive of performance for an agent. For example, correlation analysis, an information-theory analysis or a defined time-weighted algorithm (e.g., identifying sensor measurements associated with recent high performance) may be used.

At block 715, for each agent of the set of agents, performance-metric monitoring system 606 updates a data element of the agent to include a result of the application of the machine-learning technique. In one instance, updating the data element includes identifying particular types of sensors and/or measurements that provide data predictive of performance (e.g., to illustrate—to indicate in a hypothetical instance that accelerometer data is predictive, while gyroscope data is not). In one instance, updating the data element includes identifying a weight associated with a sensor and/or measurement type. In one instance, updating the data element includes identifying one or more thresholds, ranges, weightings, logic functions and/or linear or non-linear functions (e.g., associated with one or more measurement types). Thus, updating the agent data element can include adding or modifying data to indicate how and/or which particular sensor measurements are predictive of performance metrics (or performance-metric statistics) for a given agent.

At block 720, performance-metric monitoring system 606 detects one or more sensor measurements from each of the set of agents. The one or more sensor measurements can include (for example) at least one same type of measurement as indicated in the one or more communications received for a same agent at block 705. In one instance, each of the detected one or more sensor measurements was a same type of measurement as indicated in the one or more communications received for a same agent at block 705.

The sensor measurement(s) may be detected from within one or more communications received from a device of the agent. The communication(s) may have been requested (e.g., from performance-metric monitoring system 606) or transmitted from the agent device in an unsolicited manner (e.g., in accordance with a schedule; upon detecting that a condition is satisfied based on a sensor measurement; upon detecting a particular user input; and so on). One or more of the sensor measurements may include numeric values and/or processed versions thereof (e.g., averages).

At block 725, performance-metric monitoring system 606 predicts a performance metric for each of the set of agents based on the detected sensor measurements corresponding to the agent and the results of the performance of the machine-learning technique for the agent (at block 710). For example, each of one or more sensor measurements may be compared to a threshold, weighted and/or added (e.g., to another processed sensor measurement) and/or the sensor measurements may otherwise be transformed based on the machine-learning result. The predicted performance metric may be of a same, or different, depending on the embodiment, type as that indicated in a communication received at block 705 for the agent. For example, a performance metric indicated at block 705 may include a binary identifier, where a performance metric at block 725 may include a number along a continuous scale.

At block 730, connection controller system 605 identifies one or more connection channels based on the predicted performance metrics. The connection channel(s) can be identified in a device-centric or population manner. The connection channel(s) can be identified to achieve, for example, an above-threshold performance discrepancy between the agents of each connection channel, a highest average (or median, minimum or other statistic) inter-agent performance discrepancy, and so on. It will be appreciated that other non-performance factors and/or constraints, such as availability may also be considered.

Using the sensor data in process 700 can, in some instances, allow for communication channels to be established in a manner that considers a predicted real-time performance of an agent. Thus, for example, an agent who has strong performance during weekday evenings may be identified to serve as a lead agent in a communication channel with another agent with a poorer predicted real-time performance. Meanwhile, the same agent may be identified to serve as a focus agent in a communication channel with a higher predicted real-time performance during a weekend if the agent's predicted performance drops (absolutely or relatively to other agents).

While process 700 relates to using sensor measurements to predict performance, it will be appreciated that other types of data may alternatively or additionally be used. For example, location data may be used and/or device interactions (e.g., which apps are being interacted with and/or executing). In some instances, data from an input component (e.g., microphone or cursor controller) can be used.

Figure 8:
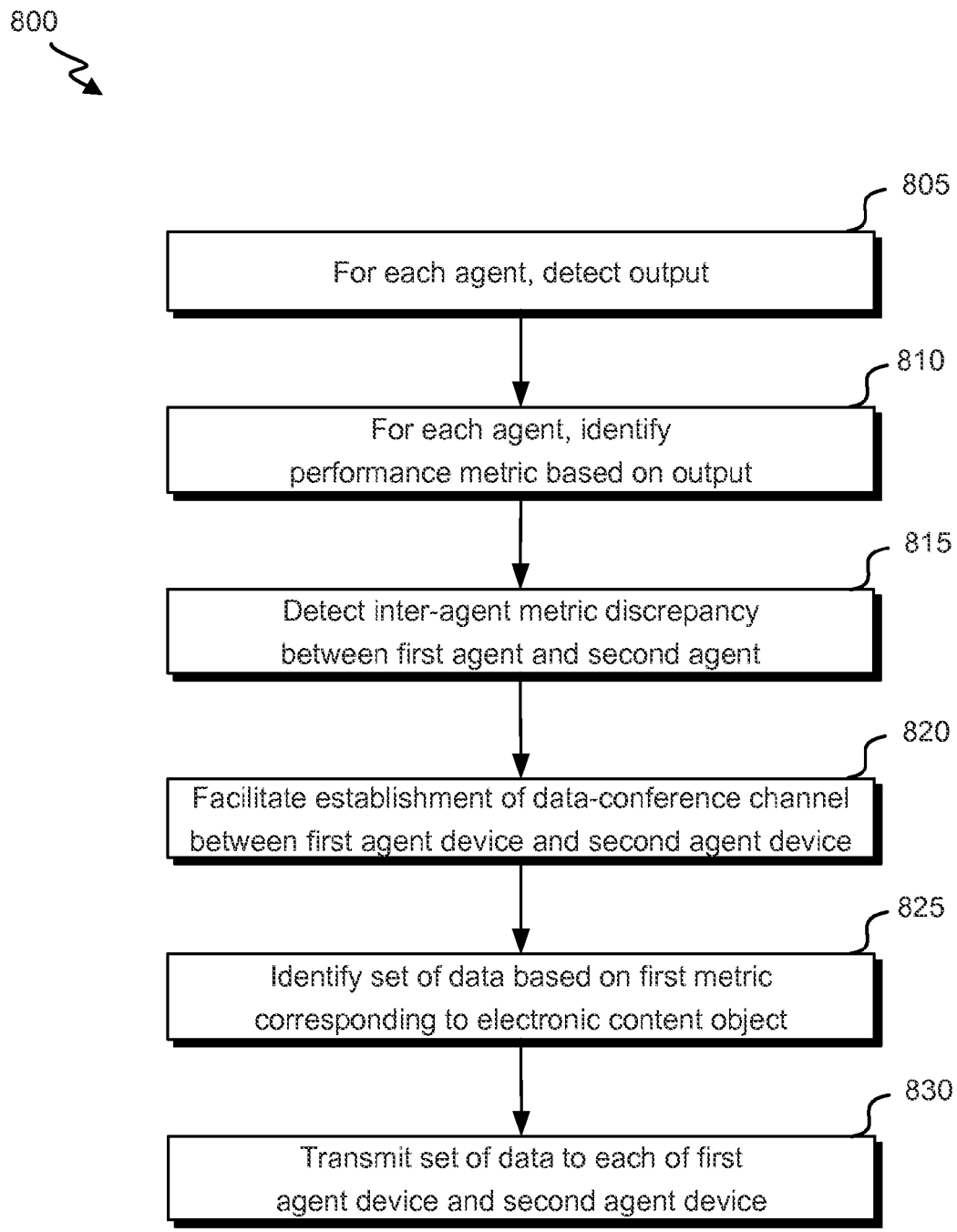
FIG. 8 illustrates a flowchart of an embodiment of a process 800 for facilitating a data exchange over a connection channel.

FIG. 8 illustrates a flowchart of an embodiment of a process 800 for facilitating a data exchange over a connection channel. Part or all of process 800 can be performed by content delivery system 408, connection controller system 606 and/or performance=metric monitoring system 606. Process 800 begins at block 805 where performance-metric monitoring system 606 detects, for each agent in a set of agents, an output. The outputs for the agents can be detected at a same or similar time (e.g., within a same 3-minute, 10-minute or hour) period or at different times (e.g., at different hours and/or days). Detecting an agent's output can include, for example, detecting—at a device of the agent—an input (e.g., key stroke, mouse click, or speech) that corresponds to particular content, such as a selection of a response option and/or detecting that a communication has been received from the device of the agent that is indicative of such input. As another example, detecting an agent's output can include detecting—at a level-2 device—an input that identifies the output (e.g., selection of response option, such as one selected by a handwritten response) and identifies the agent and/or detecting that a communication has been received from the level-2 device that identifies the output and agent.

The set of agents can include, for example, those not already included in a connection channel with another agent; those identified by a particular level-2 agent; those with devices within a defined geographic proximity to each other; those in a particular course; those requesting to be included in a connection channel; and so on.

At block 810, performance-metric monitoring system 606 identifies, for each agent in the set of agents, a performance metric. In one instance, a performance metric is identified based on whether an output indicates that the agent engaged in and/or completed a task (e.g., at least partly completed an assessment or opened a content object). In one instance, a performance metric is identified based on whether an output indicates that the output matched (and/or an extent to which it matched) a corresponding "key" output identified in a corresponding key object. In one object, the performance metric includes a scaled or unscaled version of the output itself (e.g., if a the output includes a level-2 agent's assessment of an agent response to a query).

The performance metric may, in some instances, further be based on one or more additional outputs associated with the agent and/or other factors. A performance metric may be binary, non-binary, numeric, categorical, etc. For example, a performance metric may include a real number within a scale of 0 to 100.

At block 815, performance-metric monitoring system 606 detects an inter-agent metric discrepancy between a first agent in the set of agents and a second agent in the set of agents. The detection may have been made as part of a device-specific or population analysis. In one instance, the detection includes identifying a given first agent (e.g., having submitted a communication request), in some instances—identifying whether the first agent is to be designated as a lead or focus agent, and then identifying a second agent with a complementary performance metric to that of the first metric.

What serves as a complementary metric may, in some instances, depend on the designation of the first agent. In one instance, input from an agent requesting a particular designation influences (or determines) the designation. In one instance, an agent's performance metric influences designation (e.g., identifying the agent as a lead agent if the agent is within a top 50% of a set of agents and a focus agent otherwise). In one instance, an agent's designation is influenced based on machine learning that identifies how effectively using the agent as a given type of agent (lead versus focus) improves the agent's own performance metric and/or a performance metric of another agent paired with the agent via a connection channel.

If an agent is identified as a focus agent, block 815 may include—in a device-centric instance—identifying an agent in the set with a highest performance score and/or a performance score within an absolute or relative threshold (e.g., top 10%). The converse technique may also be used. The detection may also include weighting one or more other factors, such as availability, data element-identified learning styles and/or compatibilities, geographies, etc.

At block 820, connection controller system 606 facilitates establishment of a data-conference channel between a device of the first agent and a device of the second agent. The data conference may connect the devices in a manner to facilitate: exchanging messages between the two devices, sharing content, availing locally generated task results, introducing inter-device influence of local content presentations; and so on. In one instance, the data conference includes a transmission of one or more communications to one or both of the agents (or a corresponding device) that identifies an agent (e.g., by name, email address or obscured identifier) or device of an agent (e.g., by device identifier) also to be included in the data conference. The one or more communications may include a request and/or instruction to participate in the data conference. The one or more communications may include, for example, an address of a webpage or app page via which the agent devices can communicate; a task to be processed (e.g., assessment to be worked on or completed) via the connection component; a content object to be reviewed and/or presented during a communication exchange and/or information about the other agent. The one or more communications may include instructions to present a shared whiteboard (e.g., via an app) and/or establish an audio component of the connection channel (e.g., via phone).

At block 825, content delivery system 408 identifies a set of data based on the performance metric associated with at least one of the first agent and second agent. For example, each of one, more or all electronic content objects in a set of electronic content objects may be associated with an intensity level (e.g., reflecting a difficulty of content or questions in the object; reflecting a degree of knowledge required to understand the object or correctly respond to questions in the object; reflecting a grade level corresponding to the object; and/or reflecting a percentile of agents of a given grade or class group having received a score at or above a defined threshold). Block 825 may include, for example, identifying an electronic content object with an intensity level higher than that corresponding to a performance metric of a focus agent of the first and second agents and/or identifying an electronic content object with an intensity level lower than that corresponding to a performance metric of a lead agent of the first and second agents. In one instance, an electronic content object with an intensity level higher than that corresponding to a performance metric of each of the first and second agents is selected, and in another, an electronic content object with an intensity level lower than that corresponding to a performance metric of each of the first and second agents is selected. A degree by which an intensity level is selected to be high or lower than that corresponding to a performance metric may be identified by a machine-learning technique that identifies an optimal or advantageous increment in intensity levels to promote short- and/or long-term performance.

In some instances, electronic content objects can be iteratively selected, which may allow for intensity-level selections to influenced by recent interactions with other content objects. In some instances, an electronic content object is selected based on multiple performance metric from an agent (e.g., weighted in time, sampling size, etc.). It will be appreciated that a selection of an electronic content object may also be based on non-performance factors of objects, such as (for example) language, rights-to-access, type of queries, type of content object, required device specifications, and/or input from one or more devices (e.g., of the first or second agent or of a corresponding Level-2 device) identifying a requested or required content-object parameter (e.g., type, intensity level, or length).

The set of data can include all or some of the content in the electronic content object (e.g., a portion of the object that pertains to a particular intensity level, topic and so on); an identification of an address (e.g., a web address or computer address) at which content of the electronic content object can be accessed (e.g., viewed, interacted with or downloaded); a source of the electronic content object; interaction instructions (e.g., identifying a deadline for completing a task related to the object; identifying a format for providing a response to a query within the object; and/or identifying a source to which to send responses and/or interaction data); an instruction indicating which app to use to view the electronic content object; security parameters (e.g., a key); and so on.

At block 830, content delivery system 408 transmits the set of data to a device of the first agent and to the device of the second agent. The set of data may be transmitted to the two devices at a same time or at different times (e.g., upon detecting that a given agent is available). The set of data can be transmitted to each of the devices via the data-conference channel and/or a connection channel.

In some instances, at least one of the devices of the first and second agents receives data from content delivery system 408 (e.g., that relates to the electronic content object) that the other does not. For example, a lead agent device may receive a key identifying a correct answer to and/or processing for a query included in a content object sent to both devices.

Thus, process 800 can provide a technique for uniquely selecting an electronic content object to be (e.g., collectively) processed, reviewed and/or responded to by one or more agents based on performance metrics. This selection can reduce instances in which an agent fails to complete an assigned review, query-response or interaction task and can promote a quicker advancement of agent learning so as to become able to handle more complicated content objects. The selection process may further be based to ensure that a selected object can be appropriately received at, rendered at, and/or interacted with at each agent device associated with a given channel and further, in some instances, is compatible with a data-conference configuration (e.g., for concurrent processing and/or screen sharing).

Figure 9:
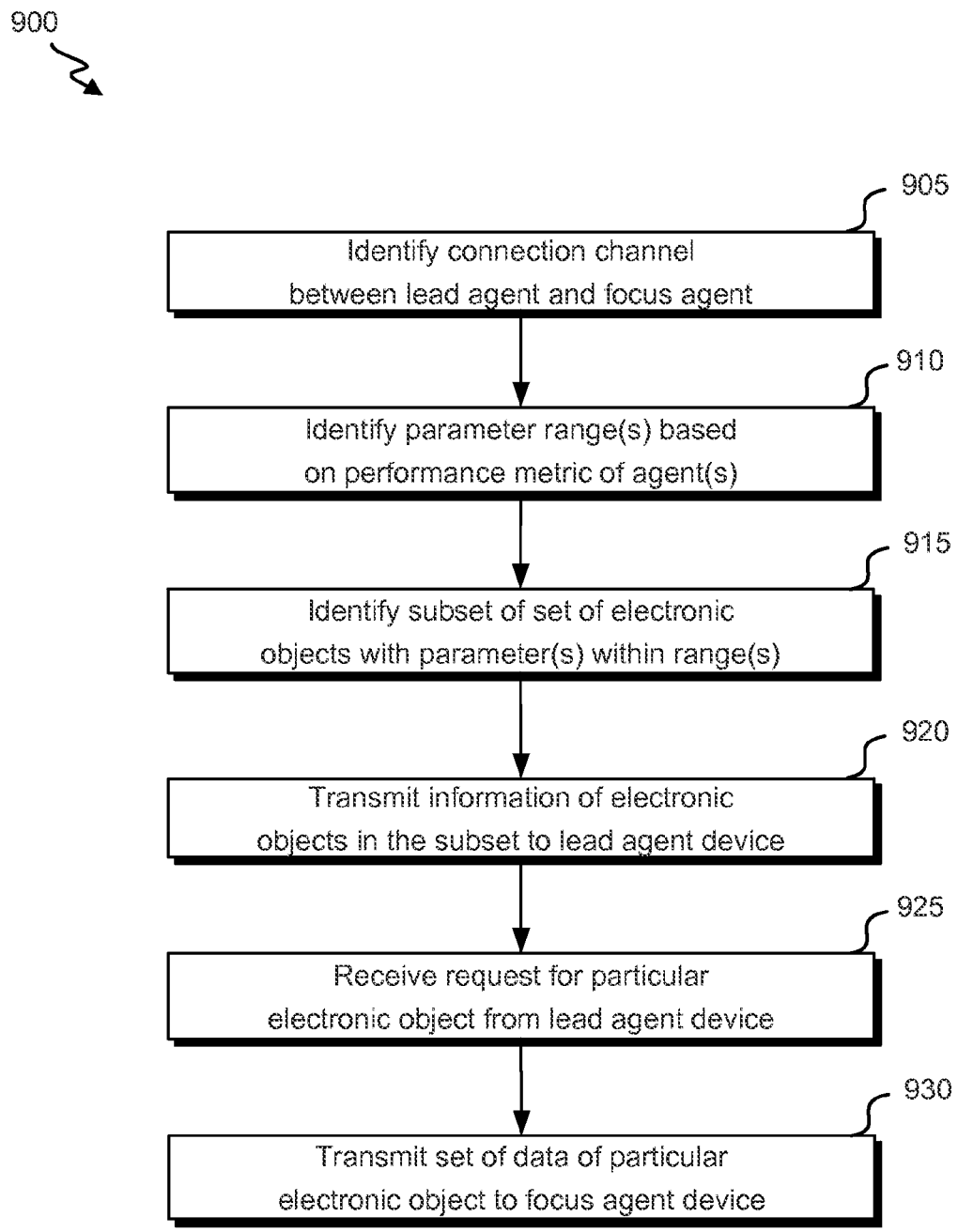
FIG. 9 illustrates a flowchart of an embodiment of a process 900 for facilitating a data exchange over a connection channel.

FIG. 9 illustrates a flowchart of an embodiment of a process 900 for facilitating a data exchange over a connection channel. Part or all of process 900 can be performed by content delivery system 408, connection controller system 606 and/or performance-metric monitoring system 606. Process 900 begins at block 905 where connection controller system 605 identifies a connection channel that connects a device of a lead agent with a device of a focus agent. Block 905 can correspond to, for example, block 610 in process 600.

At block 910, performance-metric monitoring system 606 identifies a range for each of one or more parameters based on a performance metric of the lead agent and/or a performance metric of the focus agent. Identifying a parameter range can include, for example, identifying one or more thresholds (e.g., an upper threshold and/or a lower threshold) for a parameter. Thus, a range can include identifying a numeric range bounded on one or both ends. In one instance, a range includes a non-numerical parameter range, such as a single value (e.g., "intermediate") or a list of values (e.g., "assessment, game or chapter"). Thus, a parameter range may correspond to a specification of a parameter. In one instance, a range can include a single values that corresponds to multiple lower-level values in a hierarchy (e.g., a "coding" topic value may correspond to sub-topics including C++, Java, Visual Basic and Python).

The one or more parameters can include, for example, an intensity or difficulty level (e.g., based on scores generated from other agents' previous responses provided in association with the object or based on a defined level received, for example, via input); an estimated or upper-threshold completion time; a type of object (e.g., whether an object is interactive, includes an assessment, is configured to generate a score based on responses, includes a video or audio component); or a topic (e.g., one defined based on input or one identified based on semantic analysis of content in the object).

The performance metric may include, for example, one used to identify the connection channel; one determined based on responses to one or more assessment queries by the lead agent and/or focus agent (e.g., via an associated device); one identified via a communication from a Level-2 device (e.g., representing a score derived, at least in part, based on one or more in-class assessments); and so on. The performance metric may include a performance metric of the focus agent.

A machine-learning technique may be used to identify how to relate performance metric(s) to the parameter range(s). In one instance, a target outcome is identified. For example, a training data set may be received that identifies performance metrics of one or more agents associated with one or more times and further identifies one or more scores (e.g., generated based on response identified based on inputs responsive to queries in electronic assessment content objects at agent device(s)). Each score can be based on an interaction with an electronic content object, such that the score can be associated with one or more parameters (e.g., intensity level) of the electronic content object. The technique can then learn (e.g., via a neural network technique or other machine-learning technique) how to relate a performance metric and parameter(s) with a score. This relationship can then be used to identify, for a given performance metric, one or more parameters for which a target score is predicted. Though this relationship may be learned using, for example, data corresponding to electronic content objects that may be used to generate a score, the relationship can then be used to predict understanding of other types of electronic content objects as well. Further, it will be appreciated that the relationship may be generated based on other types of A target score may be defined based on one or more thresholds. For example, a target may be that a parameter (e.g., intensity level) is to be selected such that a predicted score (e.g., which may represent an understanding or may predict a score) for a focus agent be within a defined focus-agent range (e.g., bounded at one or both ends) and/or that a predicted score for a lead agent be within a defined lead-agent range. Each of one or both ranges may include an upper bound, such that a score falling within the range is less than a top score (e.g., so as to provide illustrations of knowledge gaps) and/or a lower bound, such that a score falling within the range is higher than a bottom score (e.g., to represent current understandings). One or both of the upper and/or lower bounds may be, in some instances, higher for the lead-agent range as compared to the focus-agent range.

A parameter range may include, for example, a numeric range constrained by a numeric upper bound and/or a numeric lower bound; a non-numeric set of values; or a specified value (e.g., categorical value). For example, a parameter range can include a set of topics, each of which is associated with a focus-agent and/or lead-agent performance metric that satisfies a condition (e.g., a topic with a performance metric indicating an incomplete or sub-threshold understanding). For example, a set of performance metrics corresponding to a set of responses may be analyzed, and a correlation technique may be used to identify topics of queries for which provided responses did not match those identified in a key. As another example, for each topic, responses provided to one or more queries may be used to identify a topic-specific performance metric. Topics identified as being correlated with key inconsistencies or below-threshold topic-specific performance metrics may then be included in a topic parameter range (e.g., which can include a list or specification).

At block 915, content delivery system 408 identifies a subset of a set of electronic content objects. Each of the electronic content objects within the subset is associated with one or more parameters that are within the corresponding parameter ranges. The set of electronic content objects may correspond to, for example, those existing in electronic object data store 303 and/or those corresponding to a particular institution, grade level and/or class associated with the connection channel, the focus agent and/or the lead agent.

Each electronic content object in the set of electronic content objects can be associated with each of one or more parameters. The parameters may be identified, for example, via input or metadata received in association with an upload or generation of the electronic content objects; based on semantic analysis of the electronic content object; based on past agents' interactions with and/or reviews of the electronic content object; and so on. For example, an intensity level for a particular electronic content object may be identified based on an average score for the object obtained by a set of agents in a given grade; an average duration of time during which the electronic content object was being accessed and/or presented; a time within a year at which at least a threshold portion of a set of agents obtained a threshold score in association with the object; and/or a collection of outputs received from devices of a set of agents identifying a subjective intensity level of the electronic content object.

Those electronic content objects with parameter(s) within the corresponding parameter range(s) (e.g., or matching a specified parameter) can be identified. In some instances, each such electronic content object is included in the subset. In some instances, a selection technique (e.g., a pseudo-random selection technique; one that is biased towards objects frequently requested by other agents and/or a lead agent; one that is biased against objects previously transmitted to a focus agent; and so) is used to select an incomplete portion (e.g., a specified number) of the set of electronic content objects. In some instances, one or more additional parameter constraints are also imposed on the selection, such as one that requires language, operating-system and/or device compatibilities.

At block 920, content delivery system 408 transmits (e.g., via a web or app interface) information associated with the electronic content objects in the subset to a device of the lead agent. The information may include, for example and for each electronic content object in the subset, a name of the electronic content object, one or more parameters of the electronic content object, and/or part or all of the electronic content object itself (e.g., an image of a partial rendering of the electronic content object).

The lead agent device may present some or all of the information (e.g., via a list or array presentation or a sequential presentation). The presentation may include an option to select a particular electronic content object, to order the electronic content objects in the subset and/or to identify presentation specifications (e.g., a presentation time) for each of one or more of the electronic content objects in the subset.

At block 925, content delivery system 408 receives a request (e.g., via a web or app interface) from the lead agent device that identifies a particular electronic content object within the subset. The request can be associated with an identifier of the lead agent, device of the lead agent, focus agent, device of the focus agent, a connection channel and/or a presentation specification.

At block 930, content delivery system 408 transmits a set of data corresponding to the particular electronic content object to a device of the focus agent. In some instances, the set of data is also transmitted to the device of the lead agent. The data may be, for example, sent independently to both devices or one of the lead agent device and focus agent device may receive the set of data via a screen share with the other device. The set of data may be transmitted, in some instances, in accordance with any presentation specifications.

The set of data may be transmitted during a connection-channel session in which a device of the lead agent is communicating with a device of the focus agent and/or at another time. The set of data can include all or some of the content in the particular electronic content object (e.g., a portion of the object that pertains to a particular intensity level, topic and so on); an identification of an address (e.g., a web address or computer address) at which content of the particular electronic content object can be accessed (e.g., viewed, interacted with or downloaded); a source of the particular electronic content object; interaction instructions (e.g., identifying a deadline for completing a task related to the particular electronic content object; identifying a format for providing a response to a query within the particular electronic content object; and/or identifying a source to which to send responses and/or interaction data); an instruction indicating which app to use to view the particular electronic content object; security parameters (e.g., a key); and so on.

Thus, process 900 provides a technique for automatically identifying electronic content objects that may facilitate performance improvements for one or both agents via the subset selection. Yet still, enabling lead agents to select from amongst the subset can provide the lead agent with control in configuring a connection-channel session.

Figure 10:
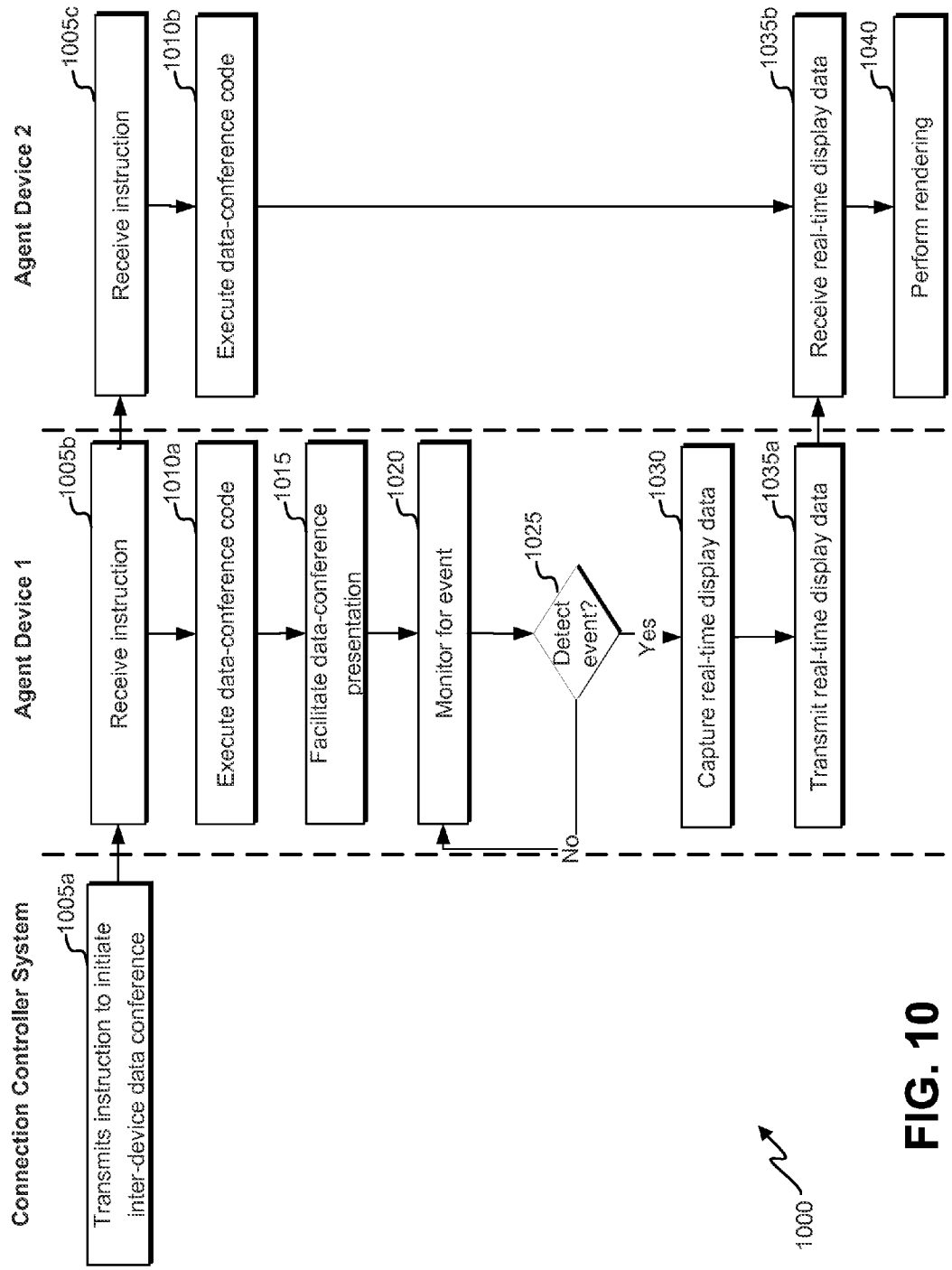
FIG. 10 shows a data flow between various components of a network.

Referring next to FIG. 10, a data flow between various components of a network is shown. At block 1005*a*, a connection controller system (e.g., connection controller system 605) transmits an instruction to initiate an inter-device data conference. The instruction may include an identifier corresponding to each of one or both of Agent Device 1 and Agent Device 2, such as an IP address The instruction can be received, at blocks 1005*b* and 1005*c*, by one or both of Agent Device 1 (e.g., a focus agent device) and Agent Device 2 (e.g., a lead agent device). In one instance, the instruction is transmitted from the connection controller system to each of Agent Device 1 and Agent Device 2. In one instance, the instruction is transmitted from the connection controller system to Agent Device 1, and Agent Device 1 can then transmit a request or instruction to join a data conference to Agent Device 2. Agent Device 1 and Agent Device 2 can correspond to devices of a lead agent and a focus agent identified for a connection channel. The data conference can include one to be conducted within a session of a connection channel.

At blocks 1010*a* and 1010*b*, each of Agent Device 1 and Agent Device 2 execute a data-conference code (e.g., associated with an app installed on one or both of the agent devices and/or with a webpage). The data-conference code can initiate and manage sessions for sharing data between the devices and/or initiates and/or manages one or more viewers on one or both of the agent devices. The can enable data corresponding to events, presentations and/or interactions from each of at least one of the agent devices to be transmitted to the other device. For example, a data conference can include a screen share and/or video/audio connection.

The code can include, for example, a code that detects presentations rendered via one or more particular applications, interaction with one or more applications, data being received via one or more input components (e.g., camera, cursor controller or microphone), and/or data rendered at a device. Detected data may be configured to be transmitted to the other device, which can then be represented in a presentation at the other device. Such a transmission may be continuous (e.g., so as to correspond to a feed from one device to the other) or discrete (e.g., such that data is transmitted between the devices upon detecting particular changes and/or other events or at defined times).

The data sharing may be uni- or bi-directional. In the latter instance, both agents may be enabled to interact with a same screen or interactions with different screens may be communicated. The data-conference code may impose constraints as to what kinds of control an agent can exert on the screen. For example, an interaction may be controlled so as to only allow inputs from a focus agent device to result in changes to one or more response fields, and inputs from a lead agent device may be limited to generate particular actions, such as generating annotations, ratings, scores, comments, chat exchanges and so on. Such controls may be fixed and defined and/or at least partly defined based on input from an agent involved in the data conference and/or a corresponding Level-2 agent.

Execution of the data-conference code may facilitate performance of one or more of blocks 1015-1040 at one or both of the devices. At block 1015, a data-conference presentation is facilitated at block 1015 via execution of the code. The data-conference presentation can include a presentation of, for example, an electronic content object (e.g., included within or being a webpage or app page), a query (e.g., as included as part of an electronic content object), an electronic whiteboard (e.g., configured to translate inputs from one or both agent devices into text, electronic drawings, etc.), a coding module, and so on.

At block 1020, Agent Device 1 monitors for an event. The event may include, for example, any input received via one or more input components (e.g., cursor controller, keyboard and/or microphone). The event may include any change to the data-conference presentation made in response to input (e.g., entry of text, option selections, etc.). The event may include an input that corresponds to submission of a query response. The event may include receipt of an electronic request for display data. The event may include a passage of a particular time (e.g., an absolute time or relative time, such as a time since a previous transmission of display data or a defined deadline time allotted for submitting one or more responses to queries in an electronic content object).

At block 1025, it is determined whether the event has been detected. If the event has not been detected, process 1000 returns to block 1020 to continue monitoring for the event. If the event has been detected, process 1000 proceeds to block 1030, where real-time display data is captured. The real-time display data can include, for example, data presented within one or more particular windows presented at Agent Device 1 or an entire screen presentation at Agent Device 1. The real-time display data can be captured, for example, via a partial or full screen capture.

The data may include, for example, a framebuffer, a collection of pixel values, an image and/or representations of particular display components (e.g., text and/or selections). In some instances, the display data corresponds to a particular array configuration, which may include—for example—a pixel or resolution array of Agent Device 1 or a standard pixel or resolution array.

At block 1035*a-b*, the real-time display data is transmitted from Agent Device 1 and received at Agent Device 2. The data may be transmitted over a secure connection, such as a VNC protocol, remote framebuffer (RFB) protocol and the like.

At block 1040, Agent Device 2 renders the display data so as to generate or update a presentation on Agent Device 2. The rendering may include, for example, facilitating or causing the display data to be presented in a viewer window, one or more particular windows (already opened or opened as part of the rendering) or across an entire screen. The rendering may include transforming a size and/or resolution of a pixel array.

Blocks 1015-1040 may be repeated at the respective devices so as to allow for a presentation to be continually and/or repeatedly updated at Agent Device 2 to reflect new display data captured at Agent Device 1. It will be appreciated that, in some instances, Agent Device 2 can also perform the actions of blocks 1015-1035*a* and Agent Device 1 the actions of blocks 1035b-1040. Such reciprocal operation may allow interactions from both agents with a same or different screen to be shared with the other agent. Agents may then be able to cooperatively act in order to, for example, process electronic content objects, respond to queries, and/or review various topics.

Techniques described herein thus provide automated identification of connection-channel configurations (e.g., identifying agent devices to be connected) based on detected performance metrics. Machine-learning techniques can identify characteristics of connections that are effective at improving performance metrics at an individual and/or population level. Real-time monitoring of performance metrics via electronic content object responses and/or other sources can enable connection channels to be dynamically reevaluated and/or reconfigured to adapt to new states of the network. Automated or semi-automated selection of electronic content objects to provide for processing via connection sessions can also improve an efficacy of improving performance metrics during the session. Technical features of data conferences such as controlled screen sharing may further promote inter-device collaboration in working towards high performance.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for facilitating establishment of wireless data-conference channels or wired-channel connections and transmitting data, the system comprising:
   a performance-monitoring subsystem that, for each of a plurality of agents:
     detects an output associated with the agent from a device; and
     identifies a metric that is indicative of a type of performance based on the output;
   a connection controller subsystem that:
     detects, based on the identified metrics, an inter-agent metric discrepancy between a first metric indicative of the type of performance and a second metric indicative of the type of performance, the first metric being associated with a first agent of the plurality of agents and the second metric being associated with a second agent of the plurality of agents; and
     facilitates establishment of a wireless data-conference channel or connection through routing through a wired channel between a first device associated with first agent and a second device associated with the second agent; and
   a content delivery subsystem that:
     identifies a set of data based on the first metric, the set of data corresponding to an electronic content object; and
     transmits the set of data to each of the first device and to the second device.

2. The system for facilitating establishment of wireless data-conference channels or wired-channel connections and transmitting data as recited in claim 1, wherein the connection controller subsystem further:
  receives detected sensor or location data from the first device;
  accesses a machine-learning result that relates sensor or location data to performance metrics; and
  identifies the first metric based on the first sensor or location data and the machine-learning result.

3. The system for facilitating establishment of wireless data-conference channels or wired-channel connections and transmitting data as recited in claim 1, wherein the connection controller subsystem further:
  receives first location data from the first device and second location data from the second device;
  determines that the first device is within an absolute, relative or functional distance from the second device based on the first location data and the second location data; and
  determines that the wireless data-conference channel is to be established between the first device and the second device based on the inter-agent metric discrepancy and the determination that the first device is within the absolute, relative or functional distance from the second device.

4. The system for facilitating establishment of wireless data-conference channels or wired-channel connections and transmitting data as recited in claim 1, wherein, for at least one of the plurality of agents, detecting the output includes detecting a response provided, at the device, to a query included in an electronic content object having been transmitted to the device, the device being a device of the agent.

5. The system for facilitating establishment of wireless data-conference channels or wired-channel connections and transmitting data as recited in claim 1, wherein, for at least one of the plurality of agents, detecting the inter-agent metric discrepancy includes:
  performing a population-level analysis to assess each of a plurality of potential networks, each potential network of the plurality of potential networks including a plurality of potential connection channels between agent devices in a set of devices, each potential connection channel connecting at least two agent devices of the set of devices, the assessment being based at least in part on a difference between performance metrics associated with each potential connection channel in the plurality of potential connection channels;
  selecting a potential network of the plurality of potential networks based on the assessment, the potential network including a potential connection channel between the first device and the second device.

6. The system for facilitating establishment of wireless data-conference channels or wired-channel connections and transmitting data as recited in claim 1, wherein facilitating the establishment of a wireless data-conference channel includes sending an Internet Protocol address for one of the first device and the second device to another of the first device and the second device.

7. The system for facilitating establishment of wireless data-conference channels or wired-channel connections and transmitting data as recited in claim 1, wherein identifying the set of data based on the first metric includes:
  identifying, for each of a set of electronic content objects, a numeric intensity level associated with the electronic content object;
  identifying an upper threshold and a lower threshold for the intensity level based on the first metric;
  identifying a subset of the set of electronic content objects, each electronic content object in the subset being associated with a numeric intensity level between the lower threshold and upper threshold; and
  automatically selecting, in a manner independent from receiving input from either the first agent device or second agent device, an electronic content object from amongst the subset.

8. The system for facilitating establishment of wireless data-conference channels or wired-channel connections and transmitting data as recited in claim 1, wherein establishing the wireless data-conference channel between the first device and the second device includes facilitating establishing a screen share between the first device and the second device so as to transmit real-time display data from the first device to the second device.

9. A method for facilitating establishment of wireless data-conference channels or wired-channel connections and transmitting data, the method comprising:
  for each of a plurality of agents:
    detecting an output associated with the agent from a device; and
    identifying a metric that is indicative of a type of performance based on the output;
  detecting, based on the identified metrics, an inter-agent metric discrepancy between a first metric indicative of the type of performance and a second metric indicative of the type of performance, the first metric being associated with a first agent of the plurality of agents and the second metric being associated with a second agent of the plurality of agents;
  facilitating establishment of a wireless data-conference channel or connection through routing through a wired channel between a first device associated with first agent and a second device associated with the second agent;
  identifying a set of data based on the first metric, the set of data corresponding to an electronic content object; and
  transmitting the set of data to each of the first device and to the second device.

10. The method for facilitating establishment of wireless data-conference channels or wired-channel connections and transmitting data as recited in claim 9, the method further comprising:
  receiving detected sensor or location data from the first device;
  accessing a machine-learning result that relates sensor or location data to performance metrics; and
  identifying the first metric based on the first sensor or location data and the machine-learning result.

11. The method for facilitating establishment of wireless data-conference channels or wired-channel connections and transmitting data as recited in claim 9, the method further comprising:
  receiving first location data from the first device and second location data from the second device;
  determining that the first device is within an absolute, relative or functional distance from the second device based on the first location data and the second location data; and
  determining that the wireless data-conference channel is to be established between the first device and the second device based on the inter-agent metric discrepancy and the determination that the first device is within the absolute, relative or functional distance from the second device.

12. The method for facilitating establishment of wireless data-conference channels or wired-channel connections and transmitting data as recited in claim 9, wherein, for at least one of the plurality of agents, detecting the output includes detecting a response provided, at the device, to a query included in an electronic content object having been transmitted to the device, the device being a device of the agent.

13. The method for facilitating establishment of wireless data-conference channels or wired-channel connections and transmitting data as recited in claim 9, wherein, for at least one of the plurality of agents, detecting the inter-agent metric discrepancy includes:
performing a population-level analysis to assess each of a plurality of potential networks, each potential network of the plurality of potential networks including a plurality of potential connection channels between agent devices in a set of devices, each potential connection channel connecting at least two agent devices of the set of devices, the assessment being based at least in part on a difference between performance metrics associated with each potential connection channel in the plurality of potential connection channels;
selecting a potential network of the plurality of potential networks based on the assessment, the potential network including a potential connection channel between the first device and the second device.

14. The method for facilitating establishment of wireless data-conference channels or wired-channel connections and transmitting data as recited in claim 9, wherein facilitating the establishment of a wireless data-conference channel includes sending an Internet Protocol address for one of the first device and the second device to another of the first device and the second device.

15. The method for facilitating establishment of wireless data-conference channels or wired-channel connections and transmitting data as recited in claim 9, wherein identifying the set of data based on the first metric includes:
identifying, for each of a set of electronic content objects, a numeric intensity level associated with the electronic content object;
identifying an upper threshold and a lower threshold for the intensity level based on the first metric;
identifying a subset of the set of electronic content objects, each electronic content object in the subset being associated with a numeric intensity level between the lower threshold and upper threshold; and
automatically selecting, in a manner independent from receiving input from either the first agent device or second agent device, an electronic content object from amongst the subset.

16. The method for facilitating establishment of wireless data-conference channels or wired-channel connections and transmitting data as recited in claim 9, wherein establishing the wireless data-conference channel between the first device and the second device includes facilitating establishing a screen share between the first device and the second device so as to transmit real-time display data from the first device to the second device.

17. A computer-program product tangibly embodied in a non-transitory machine-readable storage medium, including instructions configured to cause one or more data processors to perform actions including:
for each of a plurality of agents:
detecting an output associated with the agent from a device; and
identifying a metric that is indicative of a type of performance based on the output;
detecting, based on the identified metrics, an inter-agent metric discrepancy between a first metric indicative of the type of performance and a second metric indicative of the type of performance, the first metric being associated with a first agent of the plurality of agents and the second metric being associated with a second agent of the plurality of agents;
facilitating establishment of a wireless data-conference channel or connection through routing through a wired channel between a first device associated with first agent and a second device associated with the second agent;
identifying a set of data based on the first metric, the set of data corresponding to an electronic content object; and
transmitting the set of data to each of the first device and to the second device.

18. The computer-program product as recited in claim 17, wherein the actions further include:
receiving detected sensor or location data from the first device;
accessing a machine-learning result that relates sensor or location data to performance metrics; and
identifying the first metric based on the first sensor or location data and the machine-learning result.

19. The computer-program product as recited in claim 17, wherein the actions further include:
receiving first location data from the first device and second location data from the second device;
determining that the first device is within an absolute, relative or functional distance from the second device based on the first location data and the second location data; and
determining that the wireless data-conference channel is to be established between the first device and the second device based on the inter-agent metric discrepancy and the determination that the first device is within the absolute, relative or functional distance from the second device.

20. The computer-program product as recited in claim 17, wherein, for at least one of the plurality of agents, detecting the output includes detecting a response provided, at the device, to a query included in an electronic content object having been transmitted to the device, the device being a device of the agent.

* * * * *